(12) United States Patent
Langoju et al.

(10) Patent No.: US 12,639,785 B2

(45) Date of Patent: May 26, 2026

(54) DEEP LEARNING NEURAL NETWORK TRAINED TO PERFORM INFERENCING TASKS ON MEDICAL IMAGES WITH ROBUSTNESS AGAINST SPATIAL RESOLUTION VARIATIONS

(71) Applicant: GE Precision Healthcare LLC, Wauwatosa, WI (US)

(72) Inventors: Rajesh Langoju, Bengaluru (IN); Prasad Sudhakara Murthy, Bengaluru (IN); Utkarsh Agrawal, Bengaluru (IN); Risa Shigemasa, Tokyo (JP); Bhushan Patil, Bengaluru (IN); Bipul Das, Bengaluru (IN); Yasuhiro Imai, Tokyo (JP)

(73) Assignee: GE Precision Healthcare LLC, Waukesha, WI (US)

( * ) Notice: Subject to any disclaimer, the term of this patent is extended or adjusted under 35 U.S.C. 154(b) by 430 days.

(21) Appl. No.: 17/821,058

(22) Filed: Aug. 19, 2022

(65) Prior Publication Data

US 2024/0062331 A1 Feb. 22, 2024

(51) Int. Cl.
| | |
|---|---|
| *G06T 3/4046* | (2024.01) |
| *G06N 3/08* | (2023.01) |

(Continued)

(52) U.S. Cl.
CPC ............. *G06T 3/4046* (2013.01); *G06N 3/08* (2013.01); *G06T 5/70* (2024.01); *G06T 7/0012* (2013.01); *G06T 7/11* (2017.01)

(58) Field of Classification Search
CPC ............ G06N 3/08; G06N 20/00; G06N 3/02; G06V 10/82; G06V 10/52; G06V 10/20;

(Continued)

(56) References Cited

U.S. PATENT DOCUMENTS

| | | | | |
|---|---|---|---|---|
| 10,701,394 | B1 * | 6/2020 | Caballero | .............. G06N 3/045 |
| 2010/0097487 | A1 * | 4/2010 | Marom | .............. G02B 27/0075 |
| | | | | 348/222.1 |

(Continued)

FOREIGN PATENT DOCUMENTS

| | | | | | |
|---|---|---|---|---|---|
| CN | 104287761 | A | * | 1/2015 | |
| CN | 106570862 | A | * | 4/2017 | ........... G06T 7/0002 |

(Continued)

OTHER PUBLICATIONS

Shin et al., Deep Convolutional Neural Networks for Computer-Aided Detection: CNN Architectures, Dataset Characteristics and Transfer Learning, IEEE Transactions on Medical Imaging, vol. 35, No. 5, May 2016, pp. 1285-1298, doi: 10.1109/TMI.2016.2528162.*

(Continued)

*Primary Examiner* — Guillermo M Rivera-Martinez

(74) *Attorney, Agent, or Firm* — Amin, Turocy & Watson, LLP

(57) ABSTRACT

Systems/techniques that facilitate deep learning robustness against display field of view (DFOV) variations are provided. In various embodiments, a system can access a deep learning neural network and a medical image. In various aspects, a first DFOV, and thus a first spatial resolution, on which the deep learning neural network is trained can fail to match a second DFOV, and thus a second spatial resolution, exhibited by the medical image. In various instances, the system can execute the deep learning neural network on a resampled version of the medical image, where the resampled version of the medical image can exhibit the first DFOV and thus the first spatial resolution. In various cases, the system can generate the resampled version of the medical image by up-sampling or down-sampling the medical (Continued)

image until it exhibits the first DFOV and thus the first spatial resolution.

20 Claims, 22 Drawing Sheets

(51) Int. Cl.
|  |  |
|---|---|
| *G06T 5/70* | (2024.01) |
| *G06T 7/00* | (2017.01) |
| *G06T 7/11* | (2017.01) |

(58) Field of Classification Search
CPC .......................... G06V 10/765; G06V 10/70; G06T 2211/441; G06T 2207/20084; G06T 2207/20081; G06T 2207/30004; G06T 3/4046; G06T 5/00; G06T 7/00
See application file for complete search history.

(56) References Cited

U.S. PATENT DOCUMENTS

| | | | | |
|---|---|---|---|---|
| 2013/0202172 A1* | 8/2013 | Weitzel | ................. | G06T 11/008 |
| | | | | 382/131 |
| 2017/0300622 A1* | 10/2017 | Laviolette | .............. | G16H 50/20 |
| 2018/0139458 A1* | 5/2018 | Wang | .................... | G06T 3/4053 |
| 2018/0374209 A1* | 12/2018 | Patil | ........................ | G06N 3/084 |
| 2019/0080456 A1* | 3/2019 | Song | .................. | G06V 10/7715 |
| 2020/0167930 A1* | 5/2020 | Wang | ........................ | G06T 7/11 |
| 2020/0311926 A1* | 10/2020 | Tian | ...................... | G06T 3/4053 |
| 2020/0380689 A1* | 12/2020 | Chen | ...................... | G06V 10/82 |
| 2021/0166347 A1* | 6/2021 | Arani | ........................ | G06T 7/11 |
| 2021/0287363 A1* | 9/2021 | Bhatia | .................... | A61B 90/36 |
| 2021/0390696 A1* | 12/2021 | Iwase | ........................ | G06T 5/60 |
| 2022/0067943 A1* | 3/2022 | Claessen | .............. | G06N 3/0464 |
| 2022/0114699 A1* | 4/2022 | Hsiao | .................... | G06T 3/4046 |
| 2022/0180602 A1* | 6/2022 | Hao | ........................ | G06T 11/00 |
| 2022/0188602 A1* | 6/2022 | Meyer | .................... | G06N 3/045 |
| 2023/0104173 A1* | 4/2023 | Guo | ..................... | G06V 10/764 |
| | | | | 382/128 |

FOREIGN PATENT DOCUMENTS

| | | | | | |
|---|---|---|---|---|---|
| CN | 109410219 A | * | 3/2019 | .............. | G06T 7/11 |
| CN | 110097550 A | * | 8/2019 | .............. | G06T 7/10 |
| CN | 110599528 A | * | 12/2019 | .............. | G06T 7/33 |
| CN | 111507918 A | * | 8/2020 | ............. | G06N 3/045 |
| CN | 109754394 B | * | 2/2021 | | |

OTHER PUBLICATIONS

Li et al., A Review of the Deep Learning Methods for Medical Images Super Resolution Problems, vol. 42, Issue 2 , Apr. 2021, pp. 120-133, doi: 10.1016/j.irbm.2020.08.004.*

Toubal et al., Deep Learning Semantic Segmentation for High-Resolution Medical Volumes, 2020 IEEE Applied Imagery Pattern Recognition Workshop (AIPR), Washington DC, DC, USA, 2020, pp. 1-9, doi: 10.1109/AIPR50011.2020.9425041.*

Park et al., Computed tomography super-resolution using deep convolutional neural network, Jul. 16, 2018, Physics in Medicine & Biology, vol. 63, No. 14, pp. 1-13, DOI 10.1088/1361-6560/aacdd4.*

\* cited by examiner

900

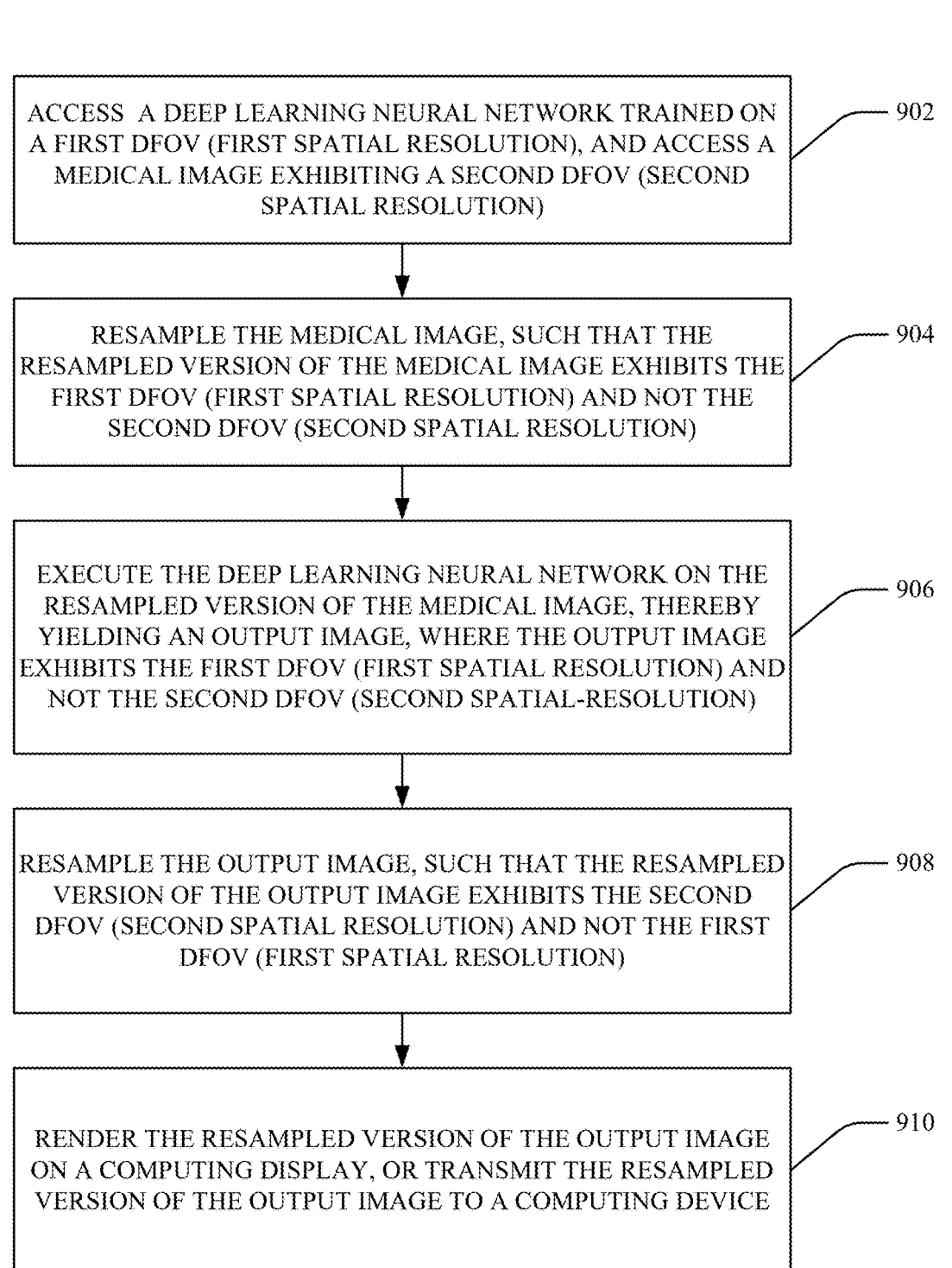

ACCESS A DEEP LEARNING NEURAL NETWORK TRAINED ON A FIRST DFOV (FIRST SPATIAL RESOLUTION), AND ACCESS A MEDICAL IMAGE EXHIBITING A SECOND DFOV (SECOND SPATIAL RESOLUTION) — 902

RESAMPLE THE MEDICAL IMAGE, SUCH THAT THE RESAMPLED VERSION OF THE MEDICAL IMAGE EXHIBITS THE FIRST DFOV (FIRST SPATIAL RESOLUTION) AND NOT THE SECOND DFOV (SECOND SPATIAL RESOLUTION) — 904

EXECUTE THE DEEP LEARNING NEURAL NETWORK ON THE RESAMPLED VERSION OF THE MEDICAL IMAGE, THEREBY YIELDING AN OUTPUT IMAGE, WHERE THE OUTPUT IMAGE EXHIBITS THE FIRST DFOV (FIRST SPATIAL RESOLUTION) AND NOT THE SECOND DFOV (SECOND SPATIAL-RESOLUTION) — 906

RESAMPLE THE OUTPUT IMAGE, SUCH THAT THE RESAMPLED VERSION OF THE OUTPUT IMAGE EXHIBITS THE SECOND DFOV (SECOND SPATIAL RESOLUTION) AND NOT THE FIRST DFOV (FIRST SPATIAL RESOLUTION) — 908

RENDER THE RESAMPLED VERSION OF THE OUTPUT IMAGE ON A COMPUTING DISPLAY, OR TRANSMIT THE RESAMPLED VERSION OF THE OUTPUT IMAGE TO A COMPUTING DEVICE — 910

FIG. 9

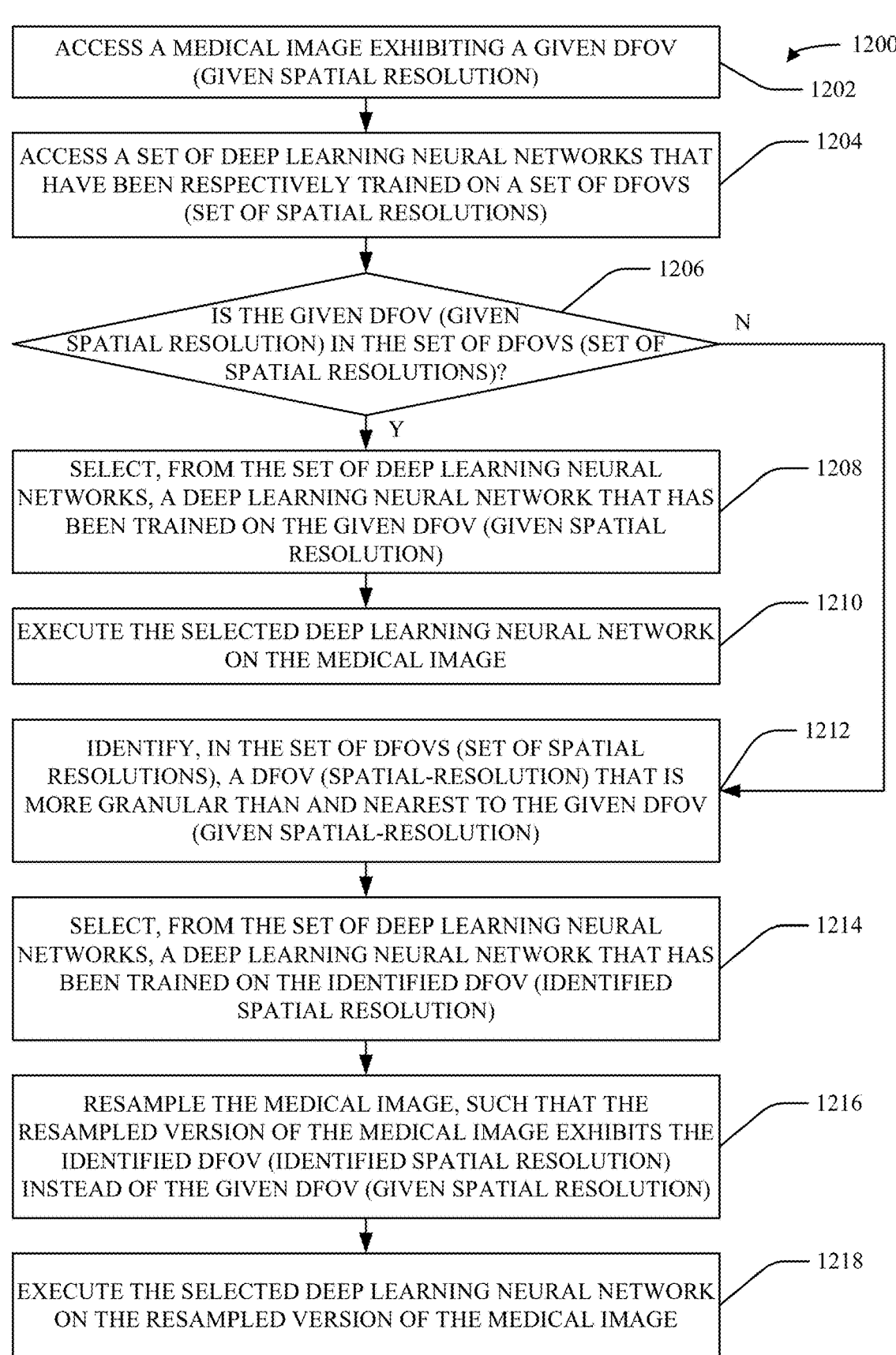

ACCESS A MEDICAL IMAGE EXHIBITING A GIVEN DFOV (GIVEN SPATIAL RESOLUTION) — 1202

1200

ACCESS A SET OF DEEP LEARNING NEURAL NETWORKS THAT HAVE BEEN RESPECTIVELY TRAINED ON A SET OF DFOVS (SET OF SPATIAL RESOLUTIONS) — 1204

IS THE GIVEN DFOV (GIVEN SPATIAL RESOLUTION) IN THE SET OF DFOVS (SET OF SPATIAL RESOLUTIONS)? — 1206

N

Y

SELECT, FROM THE SET OF DEEP LEARNING NEURAL NETWORKS, A DEEP LEARNING NEURAL NETWORK THAT HAS BEEN TRAINED ON THE GIVEN DFOV (GIVEN SPATIAL RESOLUTION) — 1208

EXECUTE THE SELECTED DEEP LEARNING NEURAL NETWORK ON THE MEDICAL IMAGE — 1210

IDENTIFY, IN THE SET OF DFOVS (SET OF SPATIAL RESOLUTIONS), A DFOV (SPATIAL-RESOLUTION) THAT IS MORE GRANULAR THAN AND NEAREST TO THE GIVEN DFOV (GIVEN SPATIAL-RESOLUTION) — 1212

SELECT, FROM THE SET OF DEEP LEARNING NEURAL NETWORKS, A DEEP LEARNING NEURAL NETWORK THAT HAS BEEN TRAINED ON THE IDENTIFIED DFOV (IDENTIFIED SPATIAL RESOLUTION) — 1214

RESAMPLE THE MEDICAL IMAGE, SUCH THAT THE RESAMPLED VERSION OF THE MEDICAL IMAGE EXHIBITS THE IDENTIFIED DFOV (IDENTIFIED SPATIAL RESOLUTION) INSTEAD OF THE GIVEN DFOV (GIVEN SPATIAL RESOLUTION) — 1216

EXECUTE THE SELECTED DEEP LEARNING NEURAL NETWORK ON THE RESAMPLED VERSION OF THE MEDICAL IMAGE — 1218

FIG. 12

1302 ⟍
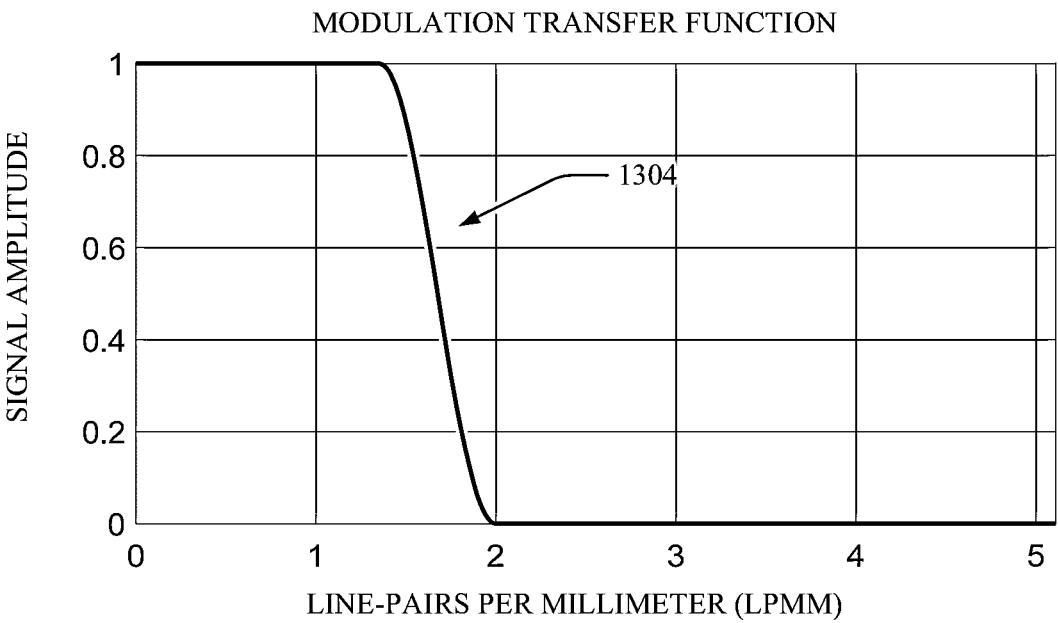
1306 ⟍
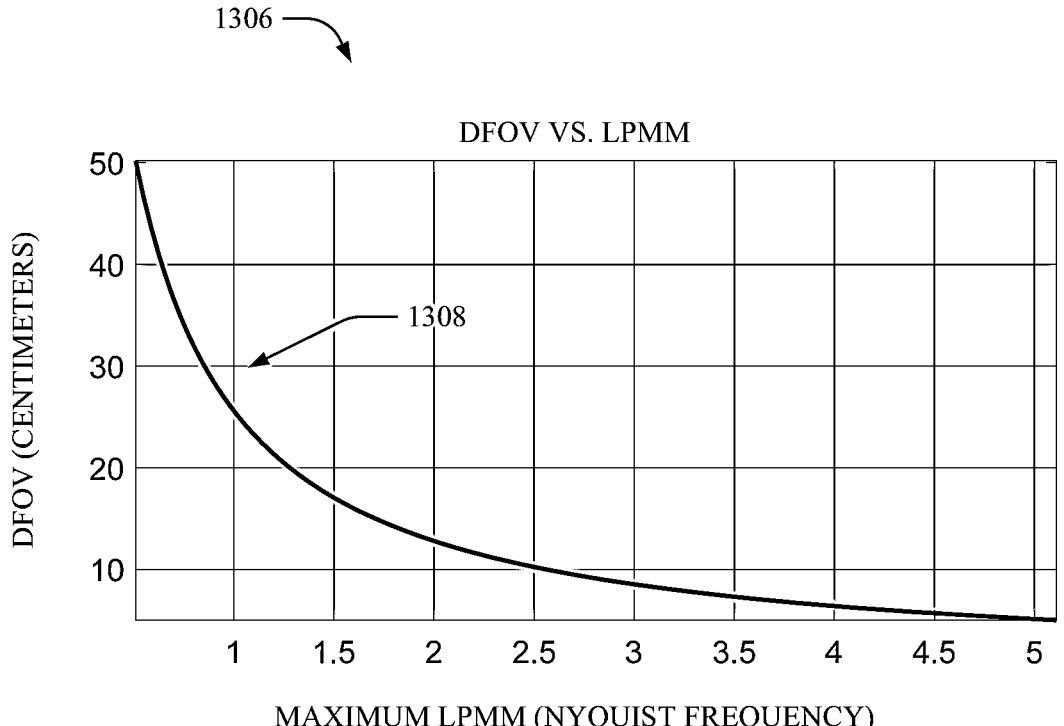
FIG. 13

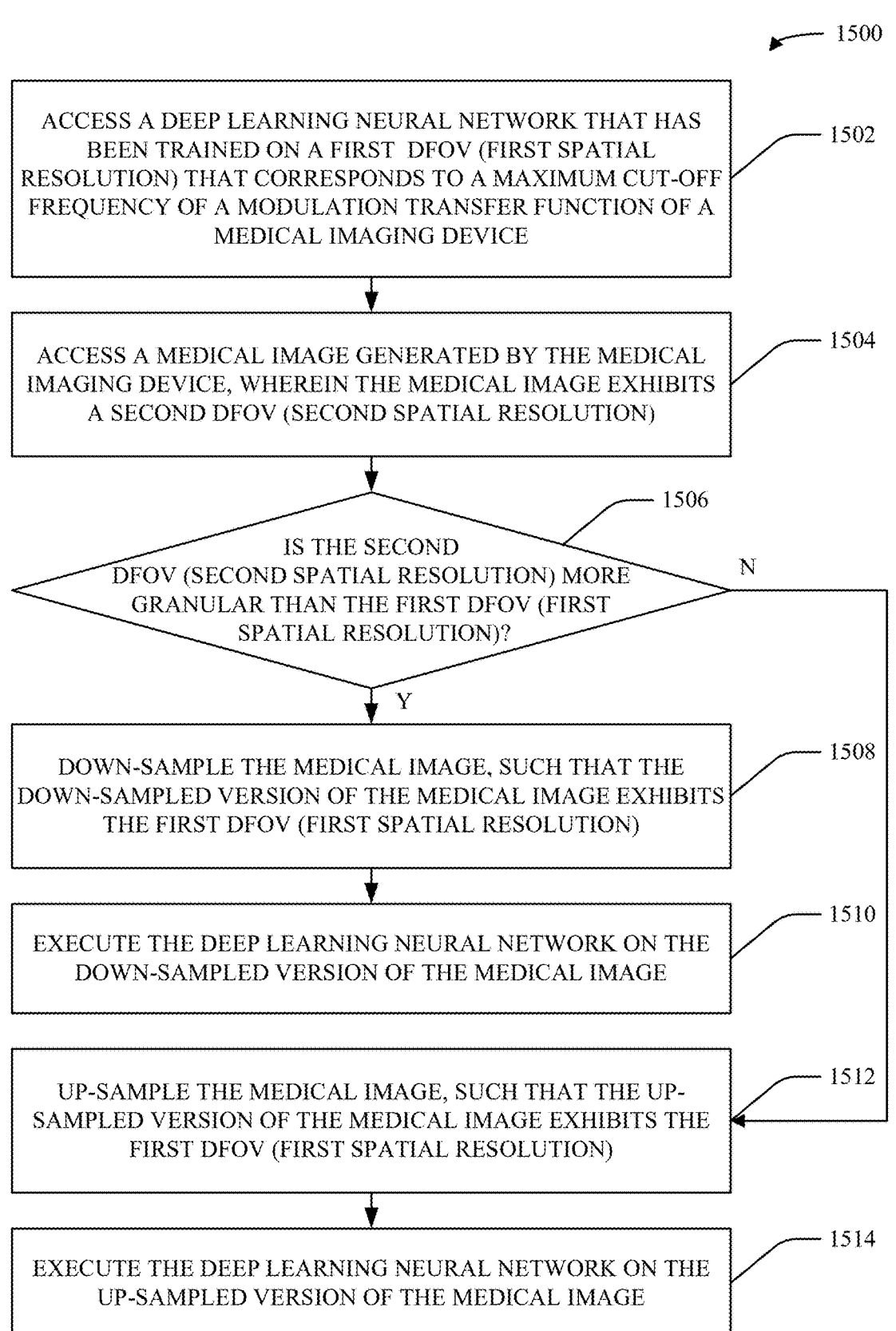

1500

ACCESS A DEEP LEARNING NEURAL NETWORK THAT HAS BEEN TRAINED ON A FIRST DFOV (FIRST SPATIAL RESOLUTION) THAT CORRESPONDS TO A MAXIMUM CUT-OFF FREQUENCY OF A MODULATION TRANSFER FUNCTION OF A MEDICAL IMAGING DEVICE — 1502

ACCESS A MEDICAL IMAGE GENERATED BY THE MEDICAL IMAGING DEVICE, WHEREIN THE MEDICAL IMAGE EXHIBITS A SECOND DFOV (SECOND SPATIAL RESOLUTION) — 1504

IS THE SECOND DFOV (SECOND SPATIAL RESOLUTION) MORE GRANULAR THAN THE FIRST DFOV (FIRST SPATIAL RESOLUTION)? — 1506

N

Y

DOWN-SAMPLE THE MEDICAL IMAGE, SUCH THAT THE DOWN-SAMPLED VERSION OF THE MEDICAL IMAGE EXHIBITS THE FIRST DFOV (FIRST SPATIAL RESOLUTION) — 1508

EXECUTE THE DEEP LEARNING NEURAL NETWORK ON THE DOWN-SAMPLED VERSION OF THE MEDICAL IMAGE — 1510

UP-SAMPLE THE MEDICAL IMAGE, SUCH THAT THE UP-SAMPLED VERSION OF THE MEDICAL IMAGE EXHIBITS THE FIRST DFOV (FIRST SPATIAL RESOLUTION) — 1512

EXECUTE THE DEEP LEARNING NEURAL NETWORK ON THE UP-SAMPLED VERSION OF THE MEDICAL IMAGE — 1514

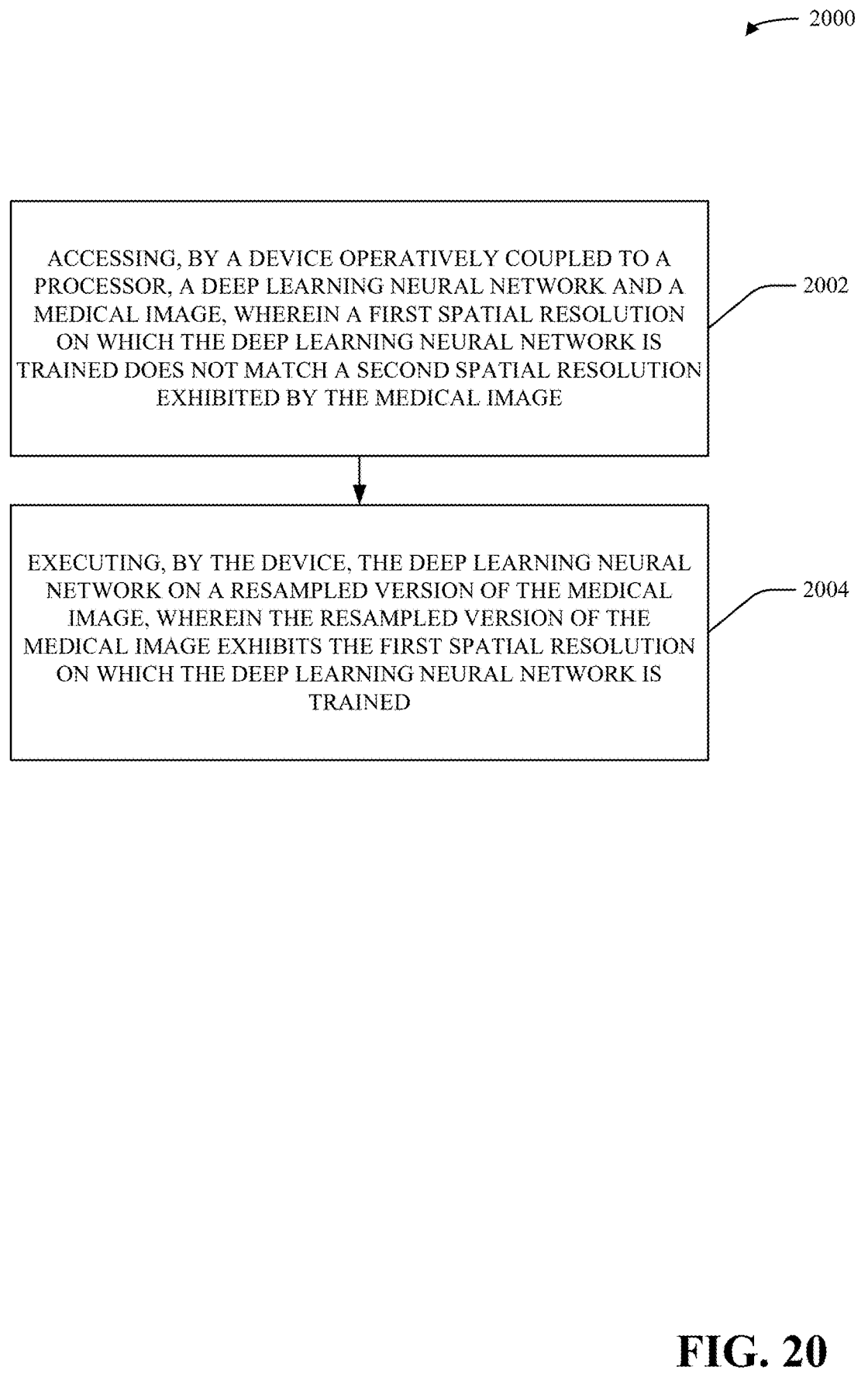

ACCESSING, BY A DEVICE OPERATIVELY COUPLED TO A PROCESSOR, A DEEP LEARNING NEURAL NETWORK AND A MEDICAL IMAGE, WHEREIN A FIRST SPATIAL RESOLUTION ON WHICH THE DEEP LEARNING NEURAL NETWORK IS TRAINED DOES NOT MATCH A SECOND SPATIAL RESOLUTION EXHIBITED BY THE MEDICAL IMAGE — 2002

EXECUTING, BY THE DEVICE, THE DEEP LEARNING NEURAL NETWORK ON A RESAMPLED VERSION OF THE MEDICAL IMAGE, WHEREIN THE RESAMPLED VERSION OF THE MEDICAL IMAGE EXHIBITS THE FIRST SPATIAL RESOLUTION ON WHICH THE DEEP LEARNING NEURAL NETWORK IS TRAINED — 2004

FIG. 20

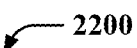
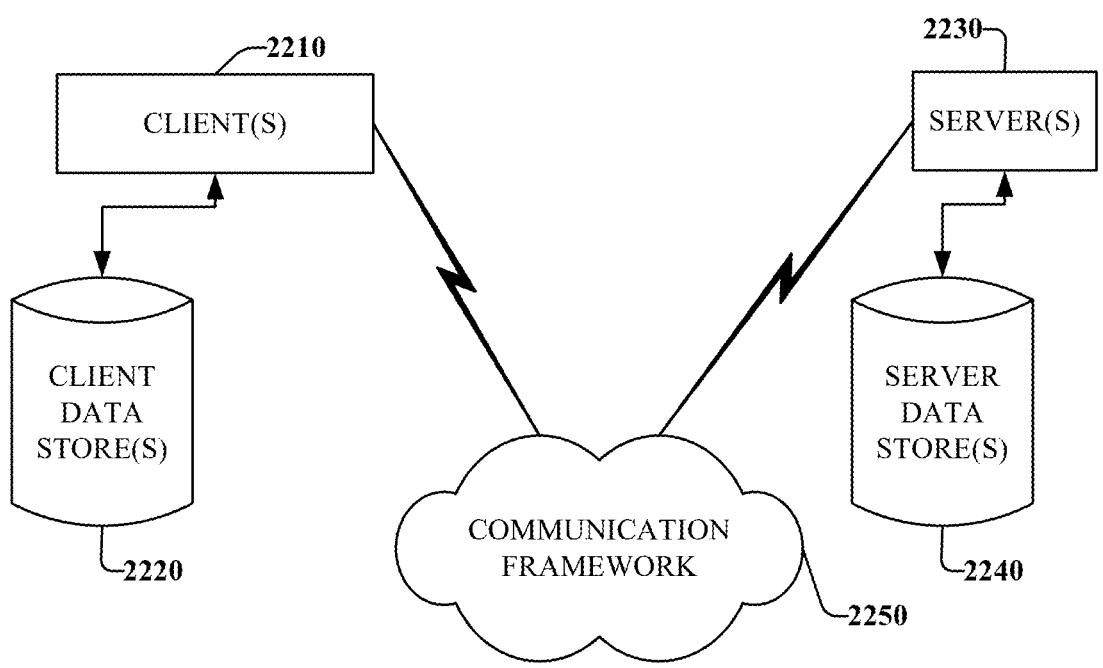
FIG. 22

DEEP LEARNING NEURAL NETWORK TRAINED TO PERFORM INFERENCING TASKS ON MEDICAL IMAGES WITH ROBUSTNESS AGAINST SPATIAL RESOLUTION VARIATIONS

TECHNICAL FIELD

The subject disclosure relates generally to deep learning, and more specifically to deep learning robustness against display field of view variations.

BACKGROUND

A deep learning neural network can be trained to perform an inferencing task on a medical image. How accurately the deep learning neural network performs the inferencing task can depend upon a display field of view of the medical image.

Accordingly, systems or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate deep learning robustness against display field of view variations are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a deep learning neural network and a medical image. In various aspects, a first spatial resolution on which the deep learning neural network is trained can fail to match a second spatial resolution exhibited by the medical image. In various instances, the computer-executable components can further comprise an execution component that can execute the deep learning neural network on a resampled version of the medical image, where the resampled version of the medical image can exhibit the first spatial resolution on which the deep learning neural network is trained.

According to one or more embodiments, the above-described system can be implemented as a computer-implemented method or a computer program product.

DESCRIPTION OF THE DRAWINGS

FIG. 9 illustrates a flow diagram of an example, non-limiting computer-implemented method that facilitates deep learning robustness against display field of view variations in accordance with one or more embodiments described herein.

FIG. 12 illustrates a flow diagram of an example, non-limiting computer-implemented method that facilitates deep learning robustness against display field of view variations in accordance with one or more embodiments described herein.

FIGS. 13-14 illustrate example, non-limiting graphs pertaining to maximum cut-off frequencies of modulation transfer functions in accordance with one or more embodiments described herein.

FIG. 15 illustrates a flow diagram of an example, non-limiting computer-implemented method that facilitates deep learning robustness against display field of view variations based on a maximum cut-off frequency of a modulation transfer function in accordance with one or more embodiments described herein.

FIGS. 16-19 illustrate example, non-limiting experimental results demonstrating various benefits of one or more embodiments described herein.

FIG. 20 illustrates a flow diagram of an example, non-limiting computer-implemented method that facilitates deep learning robustness against display field of view variations in accordance with one or more embodiments described herein.

FIG. 22 illustrates an example networking environment operable to execute various implementations described herein.

DETAILED DESCRIPTION

Figure 1:
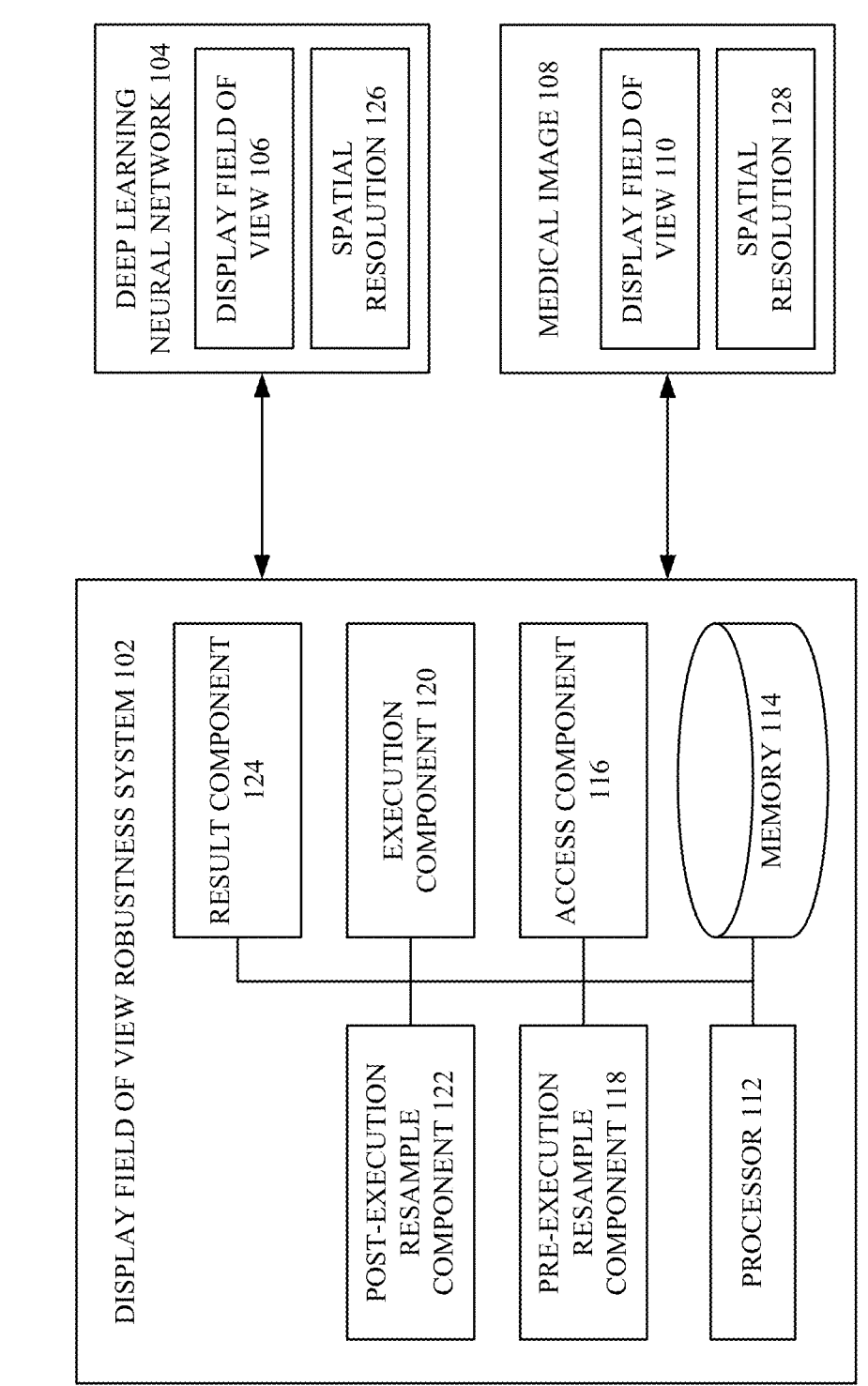
FIG. 1 illustrates a block diagram of an example, non-limiting system that facilitates deep learning robustness against display field of view variations in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A deep learning neural network can be trained (e.g., via supervised training, unsupervised training, reinforcement learning) to perform an inferencing task (e.g., image quality enhancement, image denoising, image kernel transformation) on medical images (e.g., scanned/reconstructed images generated by a computed tomography (CT) scanner, scanned/reconstructed images generated by a magnetic resonance imaging (MM) scanner, scanned/reconstructed images generated by a positron emission tomography (PET) scanner, scanned/reconstructed images generated by an X-ray scanner, scanned/reconstructed images generated by an ultrasound scanner).

In various aspects, display field of view (DFOV) can be a property, characteristic, or attribute of a medical image. More specifically, in various instances, DFOV can be considered as a controllable parameter/setting of a medical imaging device (e.g., of a CT scanner, of an MRI scanner, of a PET scanner, of an X-ray scanner, of an ultrasound scanner), where such controllable parameter/setting can influence how much or how little of a scan field of the medical imaging device is reconstructed into a medical image that is captured/generated by that medical imaging device. Because the medical imaging device can be configured to capture/generate medical images each having a given number/arrangement of pixels/voxels, the configurable value selected/chosen for the DFOV parameter/setting of the medical imaging device can influence the spatial resolution (sometimes referred to as grid size) of a medical image. That is, the configurable value selected/chosen for the DFOV parameter/setting of the medical imaging device can influence which physical dimensions are represented by each pixel/voxel of a medical image. In particular, when given a DFOV of a medical image, a spatial resolution of the medical image along any given dimension can be computed by dividing the given DFOV by the number of pixels/voxels of the medical image that extend along that given dimension (e.g., such that a more granular DFOV corresponds to a more granular spatial resolution, and such that a less granular DFOV corresponds to a less granular spatial resolution). In other words, spatial resolution of a medical image can be considered as conveying how physically large (e.g., less granular) or how physically small (e.g., more granular) the pixels/voxels of the medical image are, and spatial resolution can be directly related to DFOV. Accordingly, in various instances, DFOV and spatial resolution can be considered as correlated to each other or can otherwise be considered as related/interchangeable proxies for each other.

As a non-limiting example, suppose that the medical imaging device is configured to capture/generate medical images, each medical image being a pixel array having a length of x pixels and a width of y pixels, for any suitable positive integers x and y. Suppose further that the DFOV parameter/setting of the medical imaging device is set to a relatively large value, such as 40 centimeters (cm). In such case, a medical image captured/generated by the medical imaging device can be considered as representing a 40-by-40 $cm^2$ area, and each pixel of the medical image can be considered as representing a 40/x-by-40/y $cm^2$ area. This can be considered as a relatively coarse (e.g., less granular) spatial resolution. In contrast, suppose that the DFOV parameter/setting of the medical imaging device is instead set to a relatively small value, such as 10 cm. In such case, a medical image captured/generated by the medical imaging device can be considered as representing a 10-by-10 $cm^2$ area, and each pixel of the medical image can be considered as representing a 10/x-by-10/y $cm^2$ area. This can be considered as a relatively fine (e.g., more granular) spatial resolution. In other words, the pixels of a medical image whose DFOV is 40 cm can be considered as being larger, coarser, or less granular than the pixels of a medical image whose DFOV is 10 cm. In still other words, the pixels/voxels of a medical image can be considered as becoming smaller and thus more granular as the DFOV of the medical image decreases (e.g., spatial resolution can become more granular as DFOV becomes more granular).

Generating a training dataset from several DFOVs (from several spatial resolutions) can be infeasible. Indeed, although a model can be trained by combining images from a finite number of different DFOV settings, the performance of such model can become averaged over, instead of optimized for, that finite number of DFOV settings. Moreover, DFOV (spatial resolution) can be considered as varying across a continuous range of possible values, and so no finite set of DFOVs can cover an entirety of such continuous range.

For at least these reasons, the deep learning neural network can be trained on medical images that exhibit a single or uniform DFOV (a single or uniform spatial resolution). That is, the medical images on which the deep learning neural network is trained can all exhibit the same DFOV (the same spatial resolution) as each other. Accordingly, the deep learning neural network can thus be considered as being trained on, for, or otherwise with respect to a particular DFOV (with respect to a particular spatial resolution).

Unfortunately, when the deep learning neural network is executed on a medical image whose DFOV (whose spatial resolution) is different from that on which the deep learning neural network has been trained, the deep learning neural network can exhibit decreased inferencing accuracy. For example, suppose that the deep learning neural network is configured to perform image quality enhancement on medical images. In such case, the deep learning neural network can fail to accurately enhance a medical image whose DFOV (whose spatial resolution) does not match that on which the deep learning neural network was trained. As another example, suppose that the deep learning neural network is configured to perform image denoising on medical images. In such case, the deep learning neural network can fail to accurately denoise a medical image whose DFOV (whose spatial resolution) does not match that on which the deep learning neural network was trained. As yet another example, suppose that the deep learning neural network is configured to perform image kernel transformation on medical images. In such case, the deep learning neural network can fail to accurately apply such transformation to a medical image whose DFOV (whose spatial resolution) does not match that on which the deep learning neural network was trained.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate deep learning robustness against display field of view variations (against spatial resolution variations). In other words, the inventors of various embodiments described herein devised various techniques for accurately executing a deep learning neural network on a medical image, notwithstanding that the DFOV (the spatial resolution) of the medical image can be different from that on which the deep learning neural network has been trained. In particular, such various techniques can include: resampling (e.g., up-sampling) the medical image so that the DFOV (spatial resolution) of the resampled version of the medical image matches that on which the deep learning neural network is trained; executing the deep learning neural network on the resampled version of the medical image, thereby yielding an output image whose DFOV (whose spatial resolution) matches that on which the deep learning neural network has been trained; and resampling (e.g., down-sampling) the output image, such that the DFOV (spatial resolution) of the resampled version of the output image matches that of the medical image.

More specifically, various embodiments described herein can be considered as a computerized tool (e.g., any suitable combination of computer-executable hardware or computer-executable software) that can facilitate deep learning robustness against DFOV variations. In various aspects, such computerized tool can comprise an access component, a pre-execution resample component, an execution component, a post-execution resample component, or a result component.

In various embodiments, there can be a medical image. In various aspects, the medical image can depict one or more anatomical structures (e.g., tissues, organs, body parts, or portions thereof) of a medical patient (e.g., human, animal, or otherwise). In various instances, the medical image can exhibit any suitable format or dimensionality. For example, in some cases, the medical image can be a two-dimensional array of pixels. In other cases, the medical image can be a three-dimensional array of voxels. In various aspects, the medical image can be captured or otherwise generated by any suitable medical imaging equipment (e.g., CT scanners, MRI scanners, PET scanners, X-ray scanners, ultrasound scanners) or by any suitable image reconstruction techniques. In various instances, the medical image can be captured/generated according to any suitable DFOV (according to any suitable spatial resolution).

In various embodiments, there can be a deep learning neural network. In various aspects, the deep learning neural network can exhibit any suitable deep learning architecture. For example, the deep learning neural network can include any suitable numbers of any suitable types of layers (e.g., input layer, one or more hidden layers, output layer, any of which can be convolutional layers or non-linearity layers), can include any suitable numbers of neurons in various layers (e.g., different layers can have the same or different numbers of neurons as each other), can include any suitable activation functions (e.g., softmax, sigmoid, hyperbolic tangent, rectified linear unit) in various neurons (e.g., different neurons can have the same or different activation functions as each other), or can include any suitable interneuron connections (e.g., forward connections, skip connections, recurrent connections). In some instances, the deep learning neural network can lack dense layers (e.g., can lack fully-connected layers). In such case, the deep learning neural network can be executable on inputs of varying (e.g., not fixed) sizes (e.g., convolutional layers and non-linearity layers can be applied to inputs of arbitrary/varying sizes, whereas dense/fully-connected layers can be applied only to inputs of fixed sizes).

In various aspects, the deep learning neural network can be configured to perform any suitable inferencing task on an inputted medical image. As a non-limiting example, the inferencing task can be image quality enhancement (e.g., to increase the visual quality of an inputted medical image). As another non-limiting example, the inferencing task can be image kernel transformation (e.g., to render an inputted medical image according to a different imaging kernel, such as a bone kernel or a soft tissue kernel). As yet another non-limiting example, the inferencing task can be image denoising (e.g., to reduce the amount of visual noise present in an inputted medical image). As still another non-limiting example, the inferencing task can be image segmentation (e.g., to determine to which class each pixel/voxel of an inputted medical image belongs). In any case, the deep learning neural network can be configured to receive a medical image as input and to produce an output corresponding to the inferencing task. For example, if the inferencing task is image quality enhancement, then the deep learning neural network can be configured to produce a quality-enhanced version of the inputted medical image. As another example, if the inferencing task is image kernel transformation, then the deep learning neural network can be configured to produce a kernel-transformed version of the inputted medical image. As still another example, if the inferencing task is image denoising, then the deep learning neural network can be configured to produce a denoised version of the inputted medical image. As yet another example, if the inferencing task is image segmentation, then the deep learning neural network can be configured to produce a segmentation mask for the inputted medical image.

In various aspects, the deep learning neural network can undergo or can have undergone any suitable type or paradigm of training. For example, the deep learning neural network can undergo supervised training based on an annotated training dataset. In such case, the internal parameters (e.g., convolutional kernels) of the deep learning neural network can be randomly initialized. In various aspects, any suitable training medical image and any suitable annotation corresponding to that training medical image can be selected from the annotated training dataset.

In various cases, the selected training medical image can be fed as input to the deep learning neural network, which can cause the deep learning neural network to produce some output. More specifically, in various aspects, an input layer of the deep learning neural network can receive the selected training medical image, the selected training medical image can complete a forward pass through one or more hidden layers of the deep learning neural network, and an output layer of the deep learning neural network can compute the output based on activations provided by the one or more hidden layers of the deep learning neural network.

In various instances, the output can be considered as a prediction/inference (e.g., predicted/inferred quality-enhanced image, predicted/inferred kernel-transformed image, predicted/inferred denoised image, predicted/inferred segmentation mask) which the deep learning neural network believes should correspond to the selected training medical image. In contrast, the selected annotation can be considered as a ground-truth result (e.g., ground-truth quality-enhanced image, ground-truth kernel-transformed image, ground-truth denoised image, ground-truth segmentation mask) that is known or deemed to correspond to the selected training medical image. Note that, if the deep learning neural network has so far undergone no or little training, then the output can be highly inaccurate (e.g., the output can be very different from the selected annotation).

In any case, an error or loss (e.g., mean absolute error (MAE), mean squared error (MSE), cross-entropy) can be computed between the output and the selected annotation, and the internal parameters of the deep learning neural network can be updated by performing backpropagation (e.g., stochastic gradient descent) driven by the computed error/loss.

In various instances, such training procedure can be repeated for each training medical image in the annotated training dataset, with the result being that the internal parameters (e.g., convolutional kernels) of the deep learning neural network can become iteratively optimized to accurately generate predictions/inferences based on inputted medical images. In various cases, any suitable training batch sizes, any suitable training termination criteria, or any suitable error/loss functions can be implemented during such training.

Although the above example focuses on supervised training, this is a mere non-limiting example for ease of explanation. In various aspects, the deep learning neural network can instead undergo or have undergone unsupervised training based on an unannotated training dataset or reinforcement training based on iterative rewards/penalties. In some cases, the computerized tool described herein can facilitate or perform any of such training on the deep learning neural network.

No matter the training paradigm that the deep learning neural network has undergone, the training medical images on which the deep learning neural network is trained can, in various instances and due to practical reasons pertaining to ease of acquisition/curation of the training dataset, all exhibit a particular DFOV (a particular spatial resolution). Accordingly, the deep learning neural network can be considered as being trained or as having been trained on that particular DFOV (on that particular spatial resolution).

In various aspects, it can be desired to perform the inferencing task on the medical image. However, in various instances, it can be the case that the DFOV (the spatial resolution) exhibited by the medical image does not match the particular DFOV (the particular spatial resolution) on which the deep learning neural network has been trained. More specifically, in various cases, the DFOV (spatial resolution) of the medical image can be less granular than the particular DFOV (the particular spatial resolution) on which the deep learning neural network has been trained. That is, the pixels/voxels of the medical image can represent larger and thus less granular physical areas/volumes than the pixels/voxels of the training medical images. In other cases, however, the DFOV (spatial resolution) of the medical image can be more granular than that on which the deep learning neural network has been trained. That is, the pixels/voxels of the medical image can represent smaller and thus more granular physical areas/volumes than the pixels/voxels of the training medical images. In any case, if the deep learning neural network is executed directly on the medical image, the deep learning neural network can be expected to yield an inaccurate or imprecise inferencing output, due to such DFOV mismatch (due to such spatial resolution mismatch). In various cases, the computerized tool described herein can facilitate the performance of the inferencing task on the medical image without such loss of accuracy/precision, notwithstanding the DFOV mismatch (notwithstanding the spatial resolution mismatch).

In various embodiments, the access component of the computerized tool can electronically receive or otherwise electronically access the deep learning neural network or the medical image. In some aspects, the access component can electronically retrieve the deep learning neural network or the medical image from any suitable centralized or decentralized data structures (e.g., graph data structures, relational data structures, hybrid data structures), whether remote from or local to the access component. In any case, the access component can electronically obtain or access the deep learning neural network or the medical image, such that other components of the computerized tool can electronically interact with (e.g., read, write, edit, copy, manipulate, control, activate) the deep learning neural network or the medical image.

In various embodiments, the pre-execution resample component of the computerized tool can electronically generate a resampled version of the medical image, where the resampled version of the medical image can exhibit the particular DFOV (the particular spatial resolution) on which the deep learning neural network has been trained.

As a non-limiting example, suppose that the DFOV (spatial resolution) of the medical image is less granular than that on which the deep learning neural network has been trained. In such case, the pre-execution resample component can, in various aspects, apply any suitable up-sampling technique (e.g., nearest neighbor interpolation, bilinear interpolation, cubic or bicubic interpolation) to the medical image. In various instances, such up-sampling technique can be considered as increasing the number of pixels/voxels in the medical image. In other words, such up-sampling technique can be considered as illustrating the medical image using a larger number of pixels/voxels. Accordingly, each pixel/voxel of the resampled version of the medical image can, in such case, be considered as representing a smaller, and thus more granular, physical area/volume than each pixel/voxel of the medical image (e.g., of the original/ unaltered version of the medical image). In this way, up-sampling the medical image can be considered as making more granular the DFOV (spatial resolution) of the medical image. In various aspects, because the DFOV (spatial resolution) of the medical image and the particular DFOV (the particular spatial resolution) on which the deep learning neural network has been trained can be known, and because the DFOV (spatial resolution) of the medical image can be less granular than the particular DFOV (the particular spatial resolution) on which the deep learning neural network has been trained, the pre-execution resample component can iteratively or progressively up-sample the medical image until the DFOV (spatial resolution) of the resampled version of the medical image matches (e.g., is within any suitable threshold margin of) the particular DFOV (the particular spatial resolution) on which the deep learning neural network has been trained.

As another non-limiting example, suppose that the DFOV (spatial resolution) of the medical image is more granular than that on which the deep learning neural network has been trained. In such case, the pre-execution resample component can, in various aspects, apply any suitable down-sampling technique (e.g., box sampling, mipmap) to the medical image. In various instances, such down-sampling technique can be considered as decreasing the number of pixels/voxels in the medical image. In other words, such down-sampling technique can be considered as illustrating the medical image using a lesser number of pixels/voxels. Accordingly, each pixel/voxel of the resampled version of the medical image can, in such case, be considered as representing a larger, and thus less granular, physical area/volume than each pixel/voxel of the medical image (e.g., of the original/unaltered version of the medical image). In this way, down-sampling the medical image can be considered as making less granular the DFOV (the spatial resolution) of the medical image. In various aspects, because the DFOV (spatial resolution) of the medical image and the particular DFOV (the particular spatial resolution) on which the deep learning neural network has been trained can be known, and because the DFOV (spatial resolution) of the medical image can be less granular than the particular DFOV (the particular spatial resolution) on which the deep learning neural network has been trained, the pre-execution resample component can iteratively or progressively down-sample the medical image until the DFOV (spatial resolution) of the resampled version of the medical image matches (e.g., is within any suitable threshold margin of) the particular DFOV (the particular spatial resolution) on which the deep learning neural network has been trained.

In various embodiments, the execution component of the computerized tool can electronically execute the deep learning neural network on the resampled version of the medical image, rather than on the medical image itself. In various aspects, such execution can cause the deep learning neural network to generate an output image. More specifically, in various instances, the execution component can feed the resampled version of the medical image to an input layer of the deep learning neural network, the up-sampled version of the medical image can complete a forward pass through one or more hidden layers of the deep learning neural network, and an output layer of the deep learning neural network can compute the output image based on activations provided by the one or more hidden layers.

Note that, because the deep learning neural network can lack dense layers (e.g., can lack fully-connected layers), the deep learning neural network can be executed on inputs of any sizes (e.g., dense layers can be configured to operate on inputs of a fixed size; in contrast, convolutional layers and non-linearity layers can be applied to inputs regardless of size). Accordingly, the deep learning neural network can operate on the resampled version of the medical image, notwithstanding the change in input size caused by the pre-execution resample component.

In various aspects, the output image can correspond to the inferencing task that the deep learning neural network is configured to perform. For example, if the inferencing task is image quality enhancement, then the output image can be considered as a quality-enhanced version of the resampled version of the medical image. As another example, if the inferencing task is image denoising, then the output image can be considered as a denoised-version of the resampled version of the medical image. As still another example, if the inferencing task is image kernel transformation, then the output image can be considered as a kernel-transformed version of the resampled version of the medical image. As yet another example, if the inferencing task is image segmentation, then the output image can be considered as a segmentation mask for the resampled version of the medical image.

In any case, because the resampled version of the medical image can exhibit the particular DFOV (the particular spatial resolution) on which the deep learning neural network has been trained, the output image can likewise exhibit the particular DFOV (the particular spatial resolution) on which the deep learning neural network has been trained. In other words, the pixels/voxels of the output image can represent physical areas/volumes that are the same size as those represented by the pixels/voxels of the resampled version of the medical image.

In various embodiments, the post-execution resample component of the computerized tool can electronically generate a resampled version of the output image, where the resampled version of the output image can exhibit the DFOV (the spatial resolution) of the medical image (e.g., of the original/unaltered medical image). More specifically, the post-execution resample component can apply to the output image any suitable up-sampling technique or down-sampling technique that is the inverse of that applied by the pre-execution resample component. For example, if the pre-execution resample component applied an up-sampling technique to the medical image, then the post-execution resample component can apply a down-sampling technique to the output image. In such case, the post-execution resample component can be considered as inverting (e.g., undoing) the up-sampling performed by the pre-execution resample component (e.g., the pre-execution resample component can have increased the number of pixels/voxels in the medical image via up-sampling, whereas the post-execution resample component can decrease the number of pixels/voxels in the output image via down-sampling). As another example, if the pre-execution resample component applied a down-sampling technique to the medical image, then the post-execution resample component can apply an up-sampling technique to the output image. In such case, the post-execution resample component can be considered as inverting (e.g., undoing) the down-sampling performed by the pre-execution resample component (e.g., the pre-execution resample component can have decreased the number of pixels/voxels in the medical image via down-sampling, whereas the post-execution resample component can increase the number of pixels/voxels in the output image via up-sampling). In any case, the post-execution resample component can resample the output image, such that the resampled version of the output image can exhibit the DFOV (the spatial resolution) of the medical image rather than the particular DFOV (the particular spatial resolution) on which the deep learning neural network was trained.

In various aspects, because the DFOV (the spatial resolution) of the output image can match (e.g., be within any suitable threshold margin of) that of the medical image, the resampled version of the output image can be considered as the result that is obtained when the inferencing task is applied to the medical image. However, because the resampled version of the output image can be obtained without executing the deep learning neural network directly on the medical image, the resampled version of the output image can lack the inaccuracy/imprecision that would have otherwise been caused by the DFOV mismatch (by the spatial resolution mismatch) between the deep learning neural network and the medical image. Accordingly, the computerized tool described herein can be considered as having made the deep learning neural network robust or agnostic against variations in DFOV (against variations in spatial resolution).

In various embodiments, the result component of the computerized tool can electronically initiate or facilitate any suitable electronic actions based on the resampled version of the output image. For example, in some cases, the result component can electronically transmit the resampled version of the output image to any suitable computing device, so that a technician can be informed of the resampled version of the output image. As another example, in some cases, the result component can electronically render the resampled version of the output image on any suitable computing display, screen, or monitor, such that a technician can visually inspect the resampled version of the output image.

Therefore, various embodiments described herein can be considered as a computerized tool that can facilitate deep learning robustness against DFOV variations (against spatial resolution variations).

Various embodiments described herein can be employed to use hardware or software to solve problems that are highly technical in nature (e.g., to facilitate deep learning robustness against DFOV/spatial-resolution variations), that are not abstract and that cannot be performed as a set of mental acts by a human. Further, some of the processes performed can be performed by a specialized computer (e.g., a deep learning neural network having internal parameters such as convolutional kernels) for carrying out defined tasks related to deep learning robustness against DFOV variations. For example, such defined tasks can include: accessing, by a device operatively coupled to a processor, a deep learning neural network and a medical image, wherein a first display field of view (a first spatial resolution) on which the deep learning neural network is trained does not match a second display field of view (a second spatial resolution) exhibited by the medical image; and executing, by the device, the deep learning neural network on a resampled version of the medical image, wherein the resampled version of the medical image exhibits the first display field of view (the first spatial resolution) on which the deep learning neural network is trained. In various aspects, such defined tasks can further include: up-sampling, by the device, the medical image, thereby yielding the resampled version of the medical image, wherein the executing the deep learning neural network on the resampled version of the medical image causes the deep learning neural network to produce a first output image, wherein the first output image exhibits the first display field of view (the first spatial resolution); and down-sampling, by the device, the first output image, thereby yielding a second output image that exhibits the second display field of view (the second spatial resolution).

Such defined tasks are not performed manually by humans. Indeed, neither the human mind nor a human with pen and paper can electronically access a trained deep learning neural network and a medical image (e.g., a two-dimensional pixel array, a three-dimensional voxel array), electronically resample the medical image such that its DFOV (its spatial resolution) matches that on which the deep learning neural network was trained, electronically execute the deep learning neural network on the resampled version of the medical image thereby yielding an output image, and electronically resample the output image such that its DFOV (its spatial resolution) matches that of the medical image. Instead, various embodiments described herein are inherently and inextricably tied to computer technology and cannot be implemented outside of a computing environment. Indeed, a deep learning neural network is an inherently-computerized construct that simply cannot be implemented in any way by the human mind without computers. Furthermore, resampling (e.g., up-sampling or down-sampling) of pixel/voxel arrays are also inherently-computerized operations that cannot be implemented in any way by the human mind without computers. Accordingly, a computerized tool that resamples a medical image based on a DFOV (spatial resolution) criterion, executes a deep learning neural network on the resampled version of the medical image, and resamples the output of the deep learning neural network based on a DFOV (spatial resolution) criterion is likewise inherently-computerized and cannot be implemented in any sensible, practical, or reasonable way without computers.

Moreover, various embodiments described herein can integrate into a practical application various teachings relating to deep learning robustness against DFOV variations. As explained above, if a medical image exhibits a DFOV (a spatial resolution) that is different from the particular DFOV (the particular spatial resolution) on which a deep learning neural network has been trained, the deep learning neural network can be expected to inaccurately/imprecisely analyze the medical image. Various embodiments described herein can address this technical problem. Specifically, various embodiments described herein can involve: resampling (e.g., up-sampling or down-sampling) the medical image such that its DFOV (its spatial resolution) now matches the particular DFOV (the particular spatial resolution) on which the deep learning neural network has been trained; executing the deep learning neural network on the resampled version of the medical image, thereby yielding an output image whose DFOV (whose spatial resolution) matches the particular DFOV (the particular spatial resolution) on which the deep learning neural network has been trained; and resampling the output image such that its DFOV (its spatial resolution) now matches that of the original/un-resampled medical image. Because the resampled version of the medical image can exhibit a DFOV (spatial resolution) that matches that on which the deep learning neural network has been trained, the deep learning neural network can be accurately or precisely executed on the resampled version of the medical image. Furthermore, because the resampled version of the output image can exhibit a DFOV (spatial resolution) that matches that of the medical image, the resampled version of the output image can be considered as the result that would have been obtained if the deep learning neural network were accurately/precisely executed on the medical image. In this way, the inferencing task that the deep learning neural network is configured to perform can be accurately/precisely facilitated on the medical image, notwithstanding the DFOV mismatch (notwithstanding the spatial resolution mismatch) between the medical image and the deep learning neural network. That is, various embodiments described herein can be considered as making the deep learning neural network robust against or agnostic to DFOV variations (spatial resolution variations) in input medical images. Thus, various embodiments described herein certainly constitute a concrete and tangible technical improvement in the field of deep learning. Therefore, various embodiments described herein clearly qualify as useful and practical applications of computers.

Furthermore, various embodiments described herein can control real-world tangible devices based on the disclosed teachings. For example, various embodiments described herein can electronically resample real-world medical images generated by real-world medical imaging equipment (e.g., CT scanners, Mill scanners, X-ray scanners, PET scanner, ultrasound scanners), can electronically execute real-world deep learning neural networks on such resampled medical images, can electronically resample the results outputted by such real-world deep learning neural networks, and can electronically render such resampled results on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate deep learning robustness against DFOV variations in accordance with one or more embodiments described herein. In various embodiments, as shown, a display field of view robustness system 102 (hereafter "DFOV robustness system 102") can be electronically integrated, via any suitable wired or wireless electronic connections, with a deep learning neural network 104 or with a medical image 108.

In various embodiments, the medical image 108 can be any suitable image data that depicts any suitable anatomical structure of any suitable medical patient. As some non-limiting examples, the anatomical structure can be any suitable tissue of the medical patient (e.g., bone tissue, lung tissue, muscle tissue), any suitable organ of the medical patient (e.g., heart, liver, lung, brain), any suitable bodily fluid of the medical patient (e.g., blood, amniotic fluid), any other suitable body part of the medical patient, or any suitable portion thereof.

In various aspects, the medical image 108 can have any suitable format or dimensionality. As a non-limiting example, the medical image 108 can be an x-by-y pixel array of Hounsfield unit values, for any suitable positive integers x and y. As another non-limiting example, the medical image 108 can be an x-by-y-by-z voxel array of Hounsfield unit values, for any suitable positive integers x, y, and z.

In various instances, the medical image 108 can be captured or otherwise generated by any suitable medical imaging device (not shown). As a non-limiting example, the medical image 108 can be captured or otherwise generated by a CT scanner, in which case the medical image 108 can be considered as a CT scanned image. As another non-limiting example, the medical image 108 can be captured or otherwise generated by an MM scanner, in which case the medical image 108 can be considered as an Mill scanned image. As yet another non-limiting example, the medical image 108 can be captured or otherwise generated by a PET scanner, in which case the medical image 108 can be considered as a PET scanned image. As even another non-limiting example, the medical image 108 can be captured or otherwise generated by an X-ray scanner, in which case the medical image 108 can be considered as an X-ray scanned image. As still another non-limiting example, the medical image 108 can be captured or otherwise generated by an ultrasound scanner, in which case the medical image 108 can be considered as an ultrasound scanned image. As another non-limiting example, the medical image 108 can be captured or otherwise generated by a visible-spectrum camera, in which case the medical image 108 can be considered as an image photographed in the visible spectrum. In various aspects, the medical image 108 can undergo or can have undergone any suitable image reconstruction technique.

In any case, the medical image 108 can exhibit (e.g., can have been captured/generated according to) a display field of view 110 (hereafter "DFOV 110"). In various aspects, the DFOV 110 can have any suitable value. In various instances, the DFOV 110 can cause or otherwise correspond to a spatial resolution 128. In various cases, the DFOV 110 and the spatial resolution 128 can be considered as interchangeable properties, characteristics, or attributes of the medical image 108 that directly or indirectly indicate how much physical area/volume is represented by each pixel/voxel of the medical image 108. That is, the DFOV 110 and the spatial resolution 128 can both be considered as proxies for physical pixel/voxel size.

In various embodiments, the deep learning neural network 104 can exhibit any suitable deep learning architecture. Accordingly, the deep learning neural network 104 can have any suitable numbers of any suitable types of layers. As some non-limiting examples, the deep learning neural network 104 can include any suitable convolutional layers (e.g., whose internal parameters can be convolutional kernels) or any suitable non-linearity layers (e.g., that can apply any suitable non-linear activation functions, such as sigmoid, softmax, hyperbolic tangent, or rectified linear unit) which can be arranged in any suitable fashion or order. Regardless of the numbers or types of layers in the deep learning neural network 104, the deep learning neural network 104 can be considered as comprising an input layer, one or more hidden layers, and an output layer. Moreover, the deep learning neural network 104 can have any suitable numbers of neurons in various layers. For instance, different layers of the deep learning neural network 104 can have the same or different numbers of neurons as each other. Furthermore, the deep learning neural network 104 can have any suitable activation functions in various neurons. That is, in various cases, different neurons of the deep learning neural network 104 can have the same or different activation functions as each other. Further still, the deep learning neural network 104 can have any suitable interneuron connections or interneuron connection patterns. As some non-limiting examples, the deep learning neural network 104 can have any suitable forward connections, any suitable recurrent connections, or any suitable skip connections, any of which can be arranged in any suitable fashion or order. In various instances, the deep learning neural network 104 can lack or otherwise omit dense layers (e.g., fully-connected layers). In such case, the deep learning neural network 104 can be considered as being executable on inputs of varying sizes (e.g., convolutional kernels and non-linear activation functions can be applied regardless of input size, whereas dense layers can be applied only to a fixed size of input).

In various aspects, the deep learning neural network 104 can be configured to perform any suitable inferencing task on an inputted medical image. As some non-limiting examples, the inferencing task can be: image quality enhancement; image denoising; image kernel transformation; or image segmentation. In any case, the deep learning neural network 104 can be configured to receive a medical image as input and to produce some output corresponding to the inferencing task. As a non-limiting example, if the inferencing task is image quality enhancement, then the output generated by the deep learning neural network 104 can be considered as a quality-enhanced version of an inputted medical image (e.g., can be considered as an image that depicts the same anatomical structure of the same medical patient as the inputted medical image, but that depicts such anatomical structure with increased visual quality). As another non-limiting example, if the inferencing task is image denoising, then the output generated by the deep learning neural network 104 can be considered as a denoised-version of an inputted medical image (e.g., can be considered as an image that depicts the same anatomical structure of the same medical patient as the inputted medical image, but that depicts such anatomical structure with reduced visual noise/blurring). As yet another non-limiting example, if the inferencing task is image kernel transformation, then the output generated by the deep learning neural network 104 can be considered as a kernel-transformed version of an inputted medical image (e.g., can be considered as an image that depicts the same anatomical structure of the same medical patient as the inputted medical image, but that depicts such anatomical structure according to a different imaging kernel). As even another non-limiting example, if the inferencing task is image segmentation, then the output generated by the deep learning neural network 104 can be considered as a segmentation mask for an inputted medical image (e.g., can be considered as a pixel-wise or voxel-wise mask indicating to which of a plurality of classes each pixel or voxel of the inputted medical image belongs).

In various aspects, to facilitate the inferencing task on an inputted medical image, the deep learning neural network 104 can be trained according to any suitable type of training technique. As a non-limiting example, the deep learning neural network 104 can undergo supervised training based on an annotated training dataset, where the annotated training dataset can include a set of training medical images and a respectively corresponding set of annotations. In such case, the internal parameters (e.g., convolutional kernel elements) of the deep learning neural network 104 can be initialized in any suitable fashion (e.g., random initialization). In various aspects, any suitable training medical image can be chosen from the annotated training dataset. Furthermore, any suitable annotation that corresponds to the chosen training medical image can be chosen from the annotated training dataset. In various instances, the deep learning neural network 104 can be executed on the chosen training medical image. That is, the chosen training medical image can complete a forward pass through the layers that make up the deep learning neural network 104. In any case, such execution can cause the deep learning neural network 104 to produce some output corresponding to the inferencing task (e.g., to produce an inferred quality-enhanced version of the chosen training medical image, to produce an inferred denoised version of the chosen training medical image, to produce an inferred kernel-transformed version of the chosen training medical image, to produce an inferred segmentation mask for the chosen training medical image). In various instances, an error/loss can be computed between the generated output and the chosen annotation, and the internal parameters of the deep learning neural network 104 can be updated via backpropagation, where such backpropagation can be driven by the computed error/loss. In various aspects, such training procedure can be repeated for each training medical image in the annotated training dataset, thereby causing the internal parameters of the deep learning neural network 104 to become iteratively optimized for performing the inferencing task on inputted medical images. In various cases, any suitable training batch sizes, any suitable training termination criteria, or any suitable error/loss functions can be implemented during such training.

As some other non-limiting examples, the deep learning neural network 104 can undergo unsupervised training or reinforcement learning.

In any case, the deep learning neural network 104 can be trained to perform the inferencing task on inputted medical images. In some instances, the DFOV robustness system 102 can perform such training on the deep learning neural network 104. In other instances, the deep learning neural network 104 can be trained by any other suitable computing devices (not shown).

No matter what type of training the deep learning neural network 104 undergoes, such training can involve executing the deep learning neural network 104 on a set of training medical images (not shown). Due to data acquisition/curation practicalities, it can be the case that such set of training medical images all exhibit a same DFOV, and thus a same spatial resolution, as each other. That is, DFOV and spatial resolution can be uniform across the set of training medical images. In other words, each pixel/voxel of each training medical image can represent a same size of physical area/volume as each other. In various cases, such DFOV can be referred to as a display field of view 106 (hereafter "DFOV 106"), and such spatial resolution can be referred to as a spatial resolution 126. Thus, the deep learning neural network 104 can be considered as being or having been trained on the DFOV 106 or the spatial resolution 126.

Just as above, in various aspects, the DFOV 106 can have any suitable value, and the DFOV 106 can cause or otherwise correspond to the spatial resolution 126. In various cases, the DFOV 106 and the spatial resolution 126 can be considered as interchangeable properties, characteristics, or attributes of the medical images on which the deep learning neural network 104 was trained, which properties, characteristics, or attributes directly or indirectly indicate how much physical area/volume is represented by each pixel/voxel of the those training medical images. That is, the DFOV 106 and the spatial resolution 126 can both be considered as proxies for physical pixel/voxel size.

In various aspects, the DFOV 110 (the spatial resolution 128) can be different than the DFOV 106 (the spatial resolution 126). That is, the pixels/voxels of the medical image 108 can represent differently-sized physical areas/volumes than the pixels/voxels of the medical images on which the deep learning neural network 104 has been trained. In such case, if the deep learning neural network 104 were directly executed on the medical image 108, the deep learning neural network 104 would produce an insufficiently accurate output. That is, due to the mismatch between the DFOV 106 and the DFOV 110 (due to the mismatch between the spatial resolution 126 and the spatial resolution 128), the deep learning neural network 104 can be unable to accurately perform the inferencing task on the medical image 108 (e.g., the deep learning neural network 104 can be executed on the medical image 108, but the result produced by such execution can be inaccurate).

In various aspects, the DFOV robustness system 102 can address this technical problem, as described herein.

In various embodiments, the DFOV robustness system 102 can comprise a processor 112 (e.g., computer processing unit, microprocessor) and a non-transitory computer-readable memory 114 that is operably or operatively or communicatively connected/coupled to the processor 112. The non-transitory computer-readable memory 114 can store computer-executable instructions which, upon execution by the processor 112, can cause the processor 112 or other components of the DFOV robustness system 102 (e.g., access component 116, pre-execution resample component 118, execution component 120, post-execution resample component 122, result component 124) to perform one or more acts. In various embodiments, the non-transitory computer-readable memory 114 can store computer-executable components (e.g., access component 116, pre-execution resample component 118, execution component 120, post-execution resample component 122, result component 124), and the processor 112 can execute the computer-executable components.

In various embodiments, the DFOV robustness system 102 can comprise an access component 116. In various aspects, the access component 116 can electronically receive or otherwise electronically access the deep learning neural network 104 or the medical image 108. In various instances, the access component 116 can electronically retrieve the deep learning neural network 104 or the medical image 108 from any suitable centralized or decentralized data structures (not shown) or from any suitable centralized or decentralized computing devices (not shown). In any case, the access component 116 can electronically obtain or access the deep learning neural network 104 or the medical image 108, such that other components of the DFOV robustness system 102 can electronically interact with the deep learning neural network 104 or with the medical image 108.

In various embodiments, the DFOV robustness system 102 can further comprise a pre-execution resample component 118. In various aspects, as described herein, the pre-execution resample component 118 can electronically generate a resampled version of the medical image 108, where such resampled version can exhibit the DFOV 106 (the spatial resolution 126) instead of the DFOV 110 (the spatial resolution 128).

In various embodiments, the DFOV robustness system 102 can further comprise an execution component 120. In various instances, as described herein, the execution component 120 can electronically execute the deep learning neural network 104 on the resampled version of the medical image 108, rather than on the medical image 108 itself. Such execution can cause the deep learning neural network 104 to produce an output image, where such output image can exhibit the DFOV 106 (the spatial resolution 126) instead of the DFOV 110 (the spatial resolution 128).

In various embodiments, the DFOV robustness system 102 can further comprise a post-execution resample component 122. In various cases, as described herein, the post-execution resample component 122 can electronically generate a resampled version of the output image, where such resampled version can exhibit the DFOV 110 (the spatial resolution 128) instead of the DFOV 106 (the spatial resolution 126).

In various embodiments, the DFOV robustness system 102 can further comprise a result component 124. In various aspects, as described herein, the result component 124 can electronically transmit the resampled version of the output image to any suitable computing device, or can electronically render the resampled version of the output image on any suitable computer display.

Figure 2:
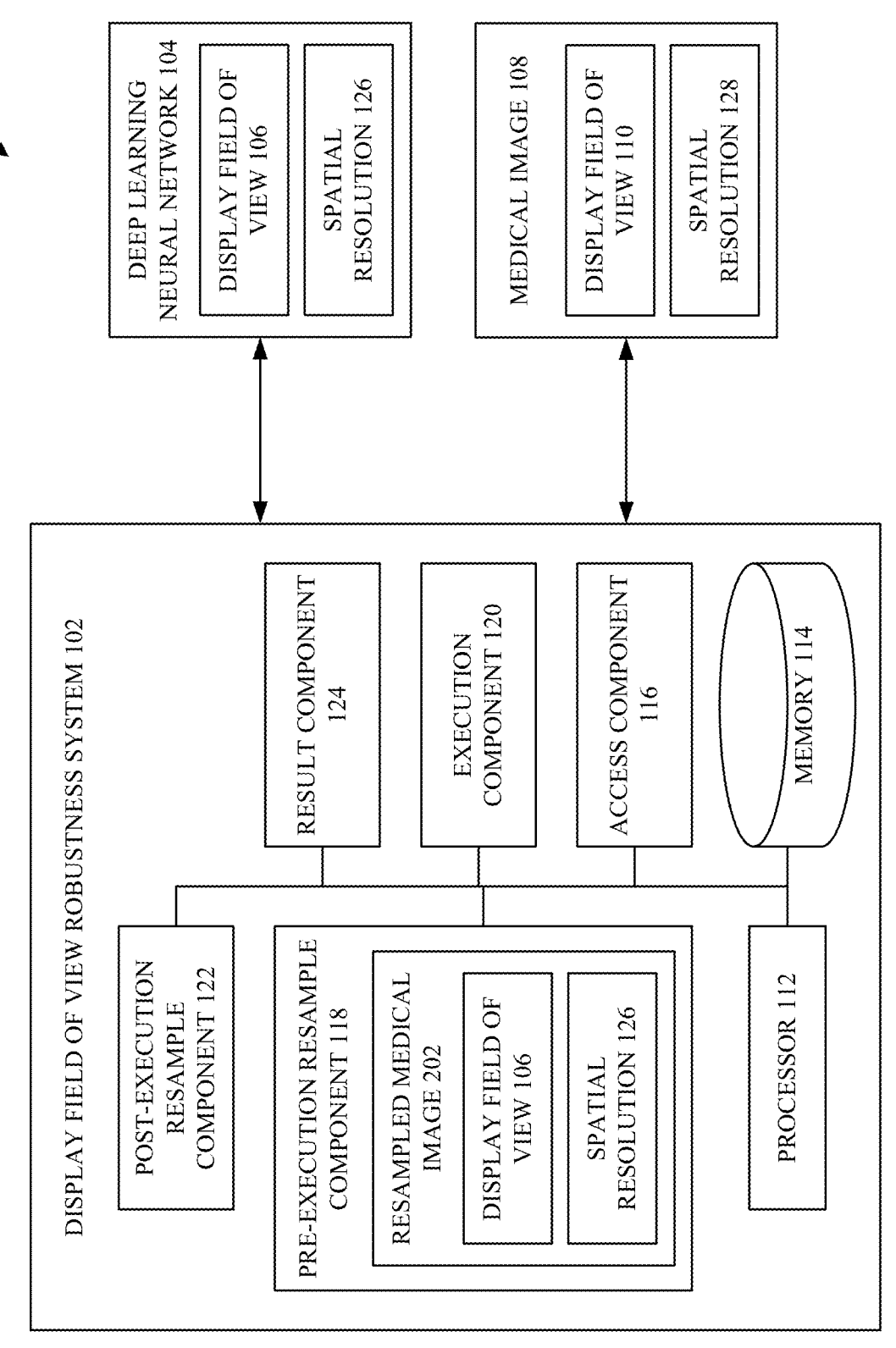
FIG. 2 illustrates a block diagram of an example, non-limiting system including a resampled medical image that facilitates deep learning robustness against display field of view variations in accordance with one or more embodiments described herein.

FIG. 2 illustrates a block diagram of an example, non-limiting system 200 including a resampled medical image that can facilitate deep learning robustness against DFOV variations in accordance with one or more embodiments described herein. As shown, the system 200 can, in some cases, comprise the same components as the system 100, and can further comprise a resampled medical image 202.

In various embodiments, the pre-execution resample component 118 can electronically generate the resampled medical image 202, based on the medical image 108. Moreover, the resampled medical image 202 can exhibit the DFOV 106 (the spatial resolution 126) as opposed to the DFOV 110 (the spatial resolution 128). This is explained more with respect to FIG. 3.

Figure 3:
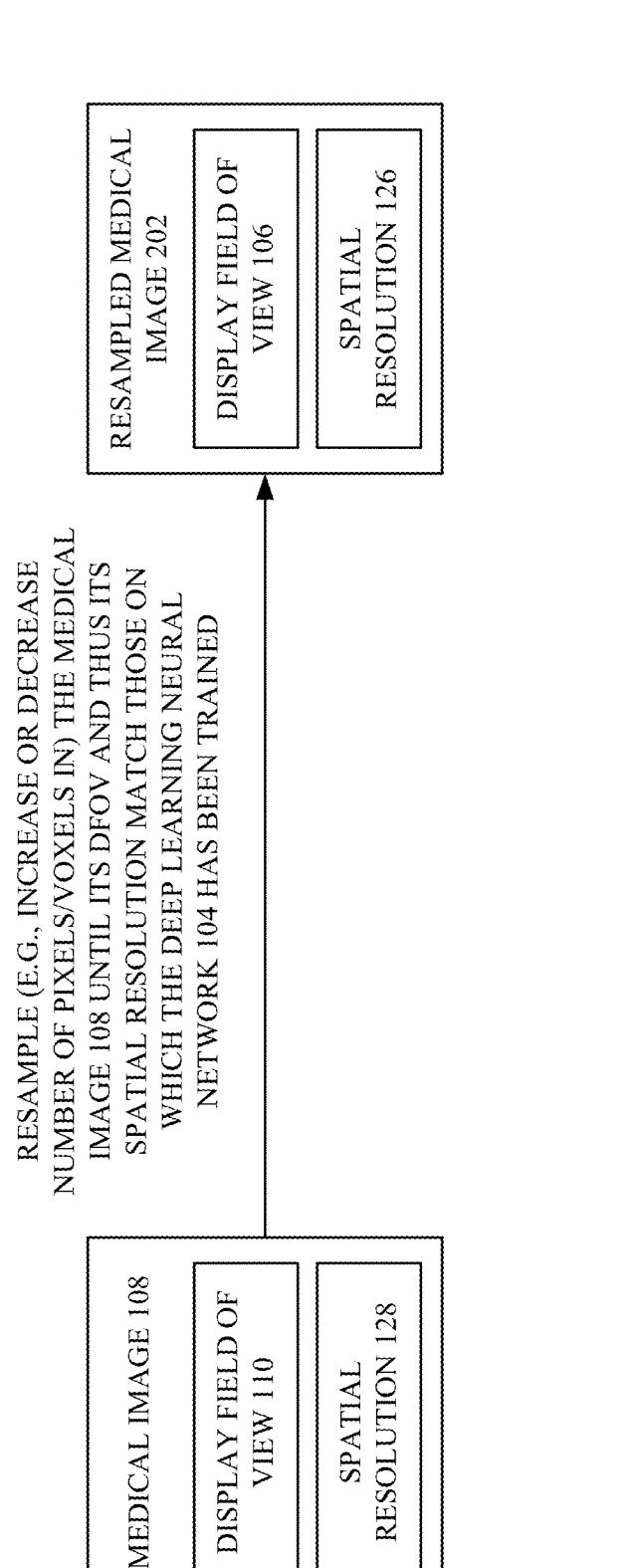
FIG. 3 illustrates an example, non-limiting block diagram showing how a resampled medical image can be generated in accordance with one or more embodiments described herein.

FIG. 3 illustrates an example, non-limiting block diagram 300 showing how the resampled medical image 202 can be generated in accordance with one or more embodiments described herein.

In various embodiments, as shown, the pre-execution resample component 118 can electronically resample the medical image 108, thereby yielding the resampled medical image 202.

In various aspects, suppose that the DFOV 110 (the spatial resolution 128) is less granular than the DFOV 106 (the spatial resolution 126). In such case, the pre-execution resample component 118 can electronically apply any suitable up-sampling technique to the medical image 108. For example, the pre-execution resample component 118 can apply nearest neighbor interpolation to the medical image 108. As another example, the pre-execution resample component 118 can apply bilinear interpolation to the medical image 108. As yet another example, the pre-execution resample component 118 can apply cubic interpolation or bicubic interpolation to the medical image 108. In any case, by applying an up-sampling technique to the medical image 108, the pre-execution resample component 118 can be considered as increasing the number of pixels/voxels that make up the medical image 108. That is, the resampled medical image 202 can be considered as depicting the same anatomical structure of the same medical patient as the medical image 108, but the resampled medical image 202 can be considered as depicting such anatomical structure using a greater number of pixels/voxels than the medical image 108. Accordingly, such up-sampling can cause the DFOV (spatial resolution) of the medical image 108 to become more granular or less coarse. That is, the DFOV (spatial resolution) of the resampled medical image 202 can be finer than the DFOV (spatial resolution) of the medical image 108.

As a non-limiting example, recall that the medical image 108 can be an x-by-y pixel array, for any suitable positive integers x and y. In some instances, the pre-execution resample component 118 can up-sample the medical image 108 by 50%, such that the resampled medical image 202 can be a 1.5(x)-by-1.5(y) pixel array (e.g., where 1.5(x) and 1.5(y) are both positive integers). In such case, each pixel of the resampled medical image 202 can be considered as representing a physical area having two-thirds the height and two-thirds the width of each pixel of the medical image 108. That is, the resampled medical image 202 can be considered having two-thirds the DFOV of the medical image 108 (e.g., as having 50% more pixel/voxel spatial resolution than the medical image 108). In other instances, the pre-execution resample component 118 can up-sample the medical image 108 by 100%, such that the resampled medical image 202 can be a 2(x)-by-2(y) pixel array. In such case, each pixel of the resampled medical image 202 can be considered as representing a physical area having half the height and half the width of each pixel of the medical image 108. That is, the resampled medical image 202 can be considered having one-half the DFOV of the medical image 108 (e.g., as having 100% more pixel/voxel spatial resolution than the medical image 108). In yet other instances, the pre-execution resample component 118 can up-sample the medical image 108 by 150%, such that the resampled medical image 202 can be a 2.5(x)-by-2.5(y) pixel array (e.g., where 2.5(x) and 2.5(y) are both positive integers). In such case, each pixel of the resampled medical image 202 can be considered as representing a physical area having two-fifths the height and two-fifths the width of each pixel of the medical image 108. That is, the resampled medical image 202 can be considered having two-fifths the DFOV of the medical image 108 (e.g., as having 150% more pixel/voxel spatial resolution than the medical image 108). In this way, the resampled medical image 202 can be considered as having a more granular DFOV (a more granular spatial resolution) than the medical image 108. It is to be appreciated that any specific numerals (e.g., 50%, 100%, 150%) provided in this example (or any other example described herein) are non-limiting.

In various other aspects, suppose that the DFOV 110 (the spatial resolution 128) is more granular than the DFOV 106 (the spatial resolution 126). In such case, the pre-execution resample component 118 can electronically apply any suitable down-sampling technique to the medical image 108. For example, the pre-execution resample component 118 can apply box sampling to the medical image 108. As another example, the pre-execution resample component 118 can apply a mipmap technique to the medical image 108. In any case, by applying a down-sampling technique to the medical image 108, the pre-execution resample component 118 can be considered as decreasing the number of pixels/voxels that make up the medical image 108. That is, the resampled medical image 202 can be considered as depicting the same anatomical structure of the same medical patient as the medical image 108, but the resampled medical image 202 can be considered as depicting such anatomical structure using a lesser number of pixels/voxels than the medical image 108. Accordingly, such down-sampling can cause the DFOV (spatial resolution) of the medical image 108 to become less granular or more coarse. That is, the DFOV (spatial resolution) of the resampled medical image 202 can be coarser than the DFOV (spatial resolution) of the medical image 108.

As a non-limiting example, recall again that the medical image 108 can be an x-by-y pixel array, for any suitable positive integers x and y. In some instances, the pre-execution resample component 118 can down-sample the medical image 108 by 25%, such that the resampled medical image 202 can be a 0.75(x)-by-0.75(y) pixel array (e.g., where 0.75(x) and 0.75(y) are both positive integers). In such case, each pixel of the resampled medical image 202 can be considered as representing a physical area having four-thirds the height and four-thirds the width of each pixel of the medical image 108. That is, the resampled medical image 202 can be considered having four-thirds the DFOV of the medical image 108 (e.g., as having 25% less pixel/voxel spatial resolution than the medical image 108). In other instances, the pre-execution resample component 118 can down-sample the medical image 108 by 50%, such that the resampled medical image 202 can be a 0.5(x)-by-0.5(y) pixel array (e.g., where 0.5(x) and 0.5(y) are both positive integers). In such case, each pixel of the resampled medical image 202 can be considered as representing a physical area having twice the height and twice the width of each pixel of the medical image 108. That is, the resampled medical image 202 can be considered having twice the DFOV of the medical image 108 (e.g., as having 50% less pixel/voxel spatial resolution than the medical image 108). In this way, the resampled medical image 202 can be considered as having a less granular DFOV (a less granular spatial resolution) than the medical image 108. It is to be appreciated that any specific numerals (e.g., 25%, 50%) provided in this example (or any other example described herein) are non-limiting.

In any case, resampling can cause the resampled medical image 202 to have a different DFOV (a different spatial resolution) than the medical image 108. Accordingly, because the DFOV 110 (the spatial resolution 128) and the DFOV 106 (the spatial resolution 126) can be known, the pre-execution resample component 118 can arithmetically determine a magnitude of resampling (e.g., a magnitude of up-sampling or down-sampling) that would be sufficient to cause the resampled medical image 202 to exhibit the DFOV 106 (the spatial resolution 126) instead of the DFOV 110 (the spatial resolution 128), and the pre-execution resample component 118 can apply such magnitude of resampling to the medical image 108, thereby yielding the resampled medical image 202.

Figure 4:
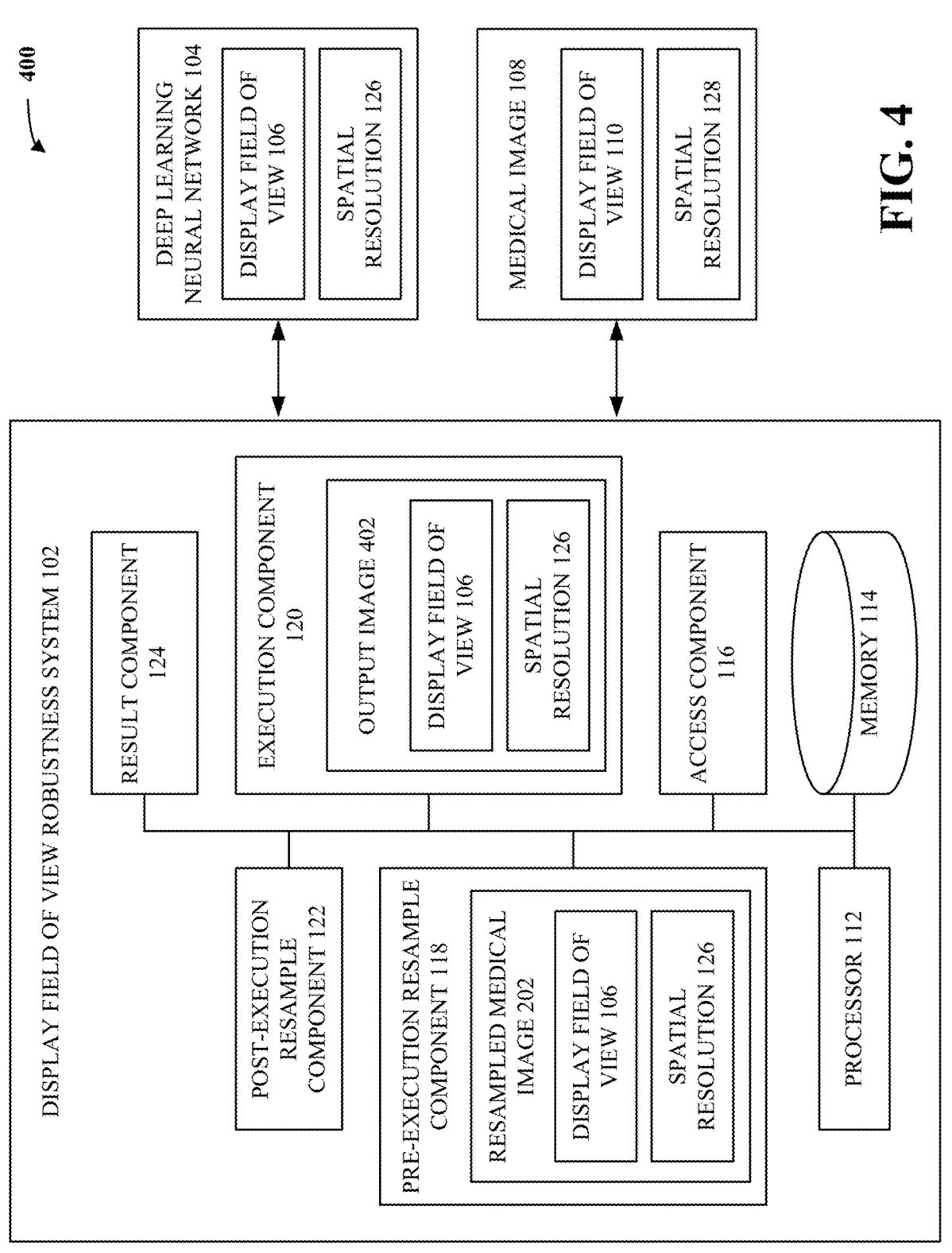
FIG. 4 illustrates a block diagram of an example, non-limiting system including an output image that facilitates deep learning robustness against display field of view variations in accordance with one or more embodiments described herein.

FIG. 4 illustrates a block diagram of an example, non-limiting system 400 including an output image that can facilitate deep learning robustness against display field of view variations in accordance with one or more embodiments described herein. As shown, the system 400 can, in some cases, comprise the same components as the system 200, and can further comprise an output image 402.

In various embodiments, the execution component 120 can electronically generate the output image 402, based on the resampled medical image 202. Moreover, the output image 402 can exhibit the DFOV 106 (the spatial resolution 126) as opposed to the DFOV 110 (the spatial resolution 128). This is explained more with respect to FIG. 5.

Figure 5:
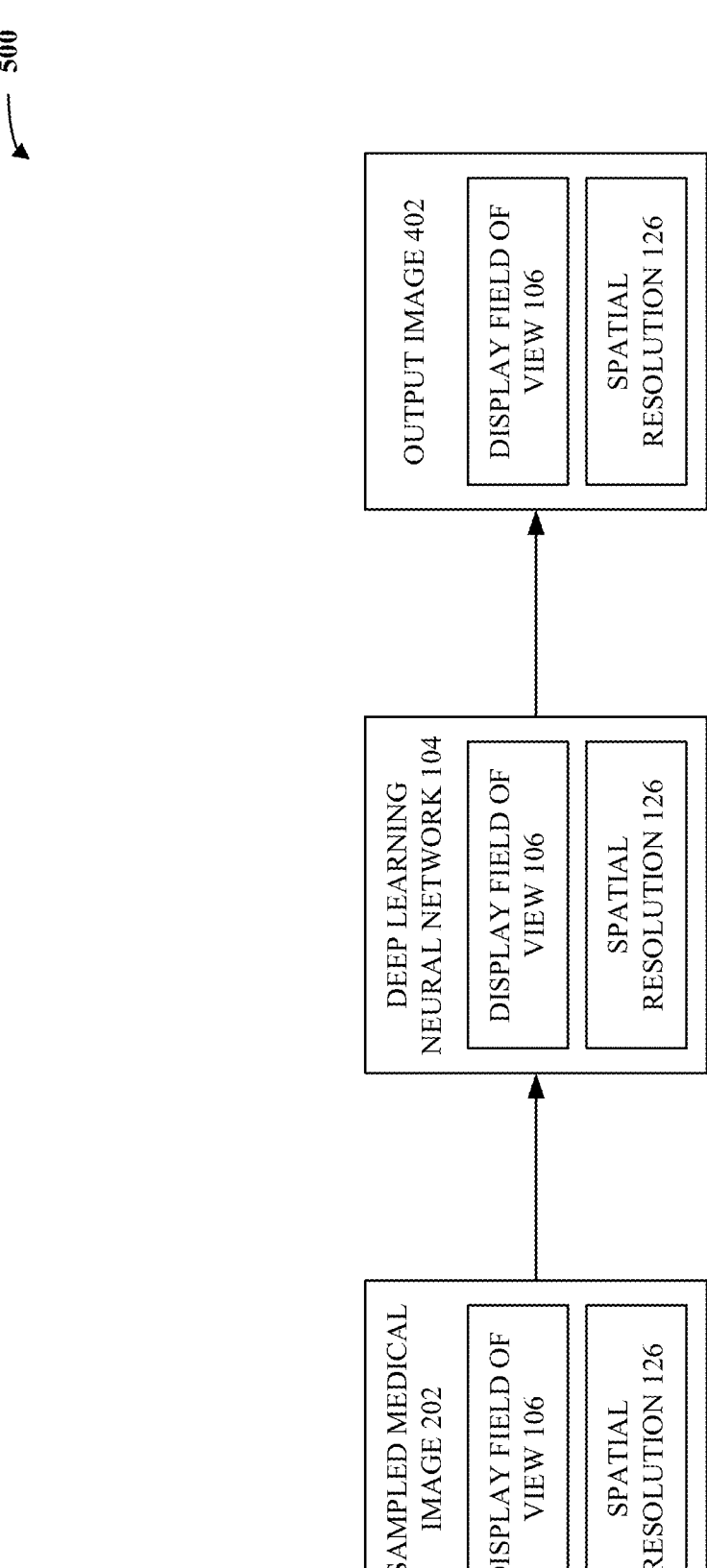
FIG. 5 illustrates an example, non-limiting block diagram showing how an output image can be generated in accordance with one or more embodiments described herein.

FIG. 5 illustrates an example, non-limiting block diagram 500 showing how the output image 402 can be generated in accordance with one or more embodiments described herein.

In various embodiments, as shown, the execution component 120 can electronically execute the deep learning neural network 104 on the resampled medical image 202. More specifically, in various aspects, the execution component 120 can feed the resampled medical image 202 to an input layer of the deep learning neural network 104. In various instances, the resampled medical image 202 can complete a forward pass through one or more hidden layers of the deep learning neural network 104, thereby generating various activation maps. In various cases, an output layer of the deep learning neural network 104 can compute the output image 402, based on the activation maps generated by the one or more hidden layers.

Note that, because the deep learning neural network 104 can include convolutional layers or non-linear layers and can lack dense layers, the deep learning neural network 104 can be unconstrained by input size. After all, dense layers can be applied only on inputs of fixed size, whereas convolutional layers and non-linear layers can be applied on inputs regardless of size. Accordingly, since the deep learning neural network 104 can include convolutional layers or non-linear layers and can lack dense layers, the deep learning neural network 104 can be executed on the resampled medical image 202, regardless of the size of (e.g., regardless of the number of pixels/voxels in) the resampled medical image 202.

In various aspects, the output image 402 can correspond to the inferencing task that the deep learning neural network 104 is configured to perform. More specifically, the output image 402 can be considered as the result obtained when the inferencing task is performed on the resampled medical image 202. As a non-limiting example, if the inferencing task is image quality enhancement, then the output image 402 can be considered as an inferred quality-enhanced version of the resampled medical image 202. As another non-limiting example, if the inferencing task is image denoising, then the output image 402 can be considered as an inferred denoised version of the resampled medical image 202. As yet another non-limiting example, if the inferencing task is image kernel transformation, then the output image 402 can be considered as an inferred kernel-transformed version of the resampled medical image 202. As still another non-limiting example, if the inferencing task is image segmentation, then the output image 402 can be considered as an inferred segmentation mask of the resampled medical image 202.

In various aspects, the output image 402 can exhibit the same dimensionality (e.g., the same number or arrangement of pixels/voxels) as the resampled medical image 202. Accordingly, the output image 402 can likewise exhibit the same DFOV (the same spatial resolution) as the resampled medical image 202. In other words, because the resampled medical image 202 can exhibit the DFOV 106 (the spatial resolution 126), the output image 402 can likewise exhibit the DFOV 106 (the spatial resolution 126). That is, the physical area/volume represented by each pixel/voxel of the output image 402 can be equal to that represented by each pixel/voxel of the resampled medical image 202.

Figure 6:
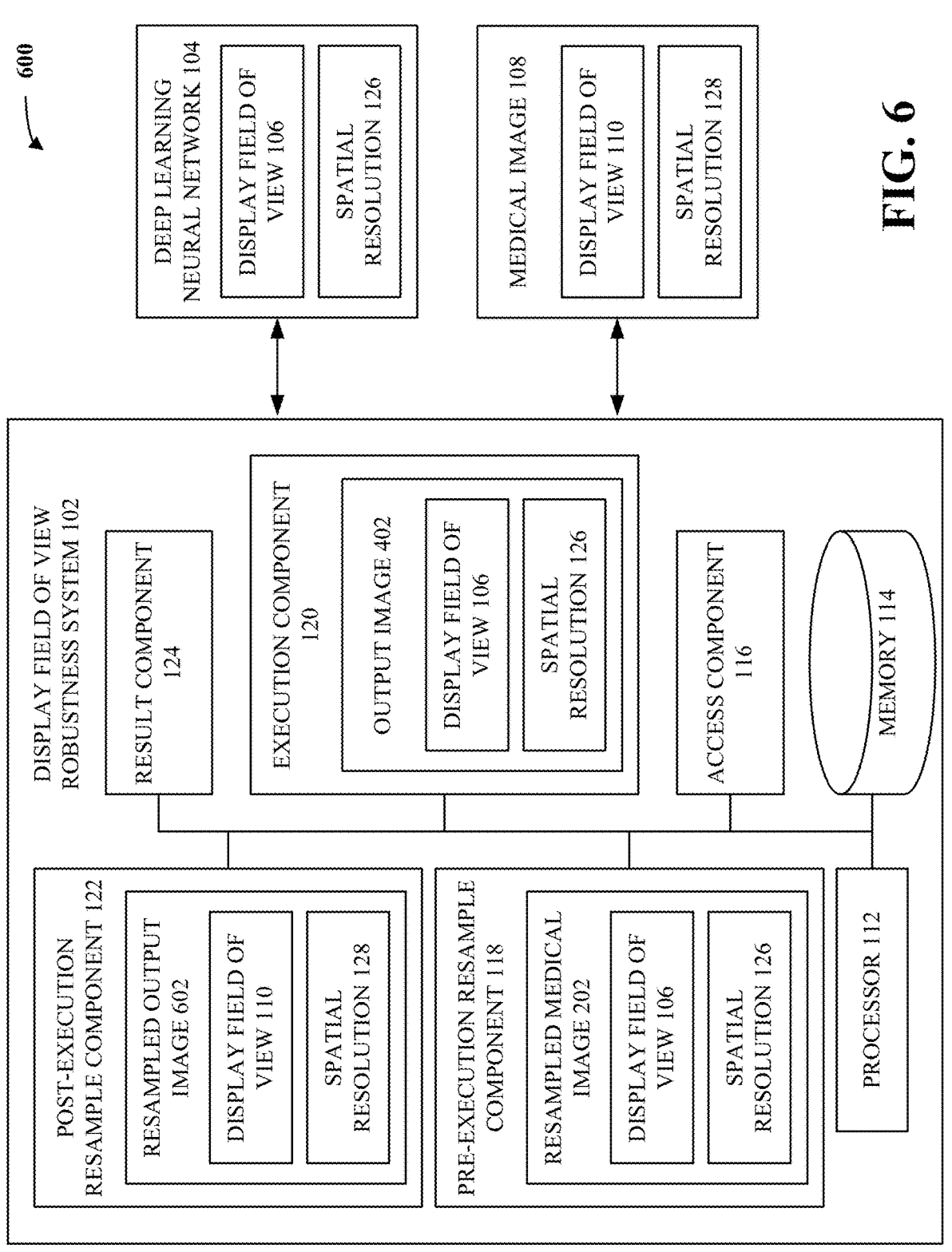
FIG. 6 illustrates a block diagram of an example, non-limiting system including a resampled output image that facilitates deep learning robustness against display field of view variations in accordance with one or more embodiments described herein.

FIG. 6 illustrates a block diagram of an example, non-limiting system 600 including a resampled output image that can facilitate deep learning robustness against display field of view variations in accordance with one or more embodiments described herein. As shown, the system 600 can, in some cases, comprise the same components as the system 400, and can further comprise a resampled output image 602.

In various embodiments, the post-execution resample component 122 can electronically generate the resampled output image 602, based on the output image 402. Moreover, the resampled output image 602 can exhibit the DFOV 110 (the spatial resolution 128) as opposed to the DFOV 106 (the spatial resolution 126). This is explained more with respect to FIG. 7.

Figure 7:
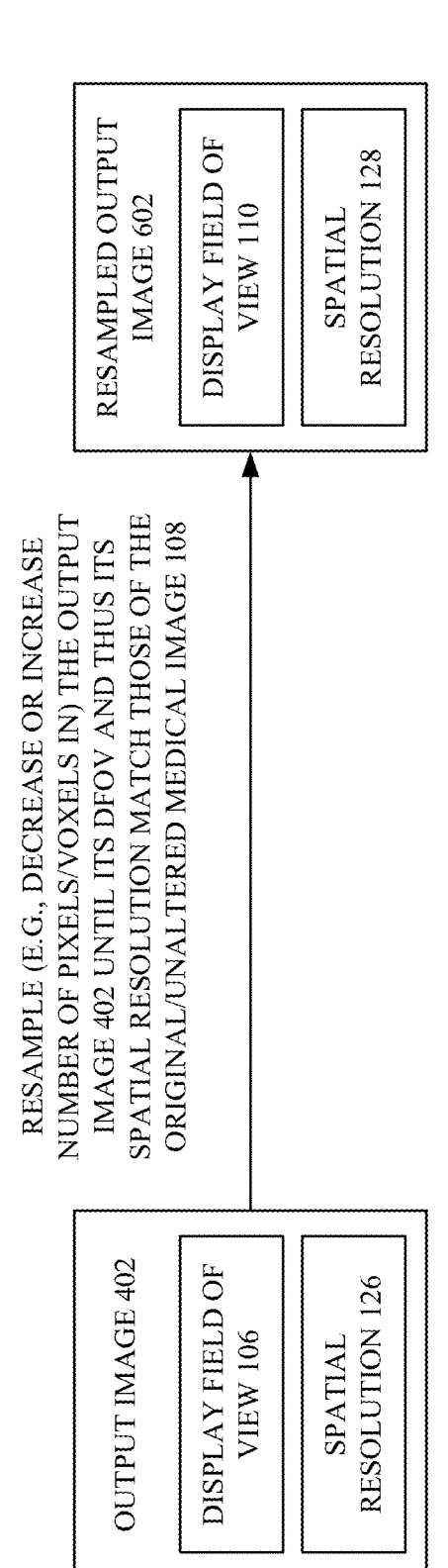
FIG. 7 illustrates an example, non-limiting block diagram showing how a resampled output image can be generated in accordance with one or more embodiments described herein.

FIG. 7 illustrates an example, non-limiting block diagram showing how the resampled output image 602 can be generated in accordance with one or more embodiments described herein.

In various embodiments, as shown, the post-execution resample component 122 can electronically resample the output image 402, thereby yielding the resampled output image 602. In particular, the post-execution resample component 122 can electronically apply any suitable resampling technique to the output image 402, where such resampling technique can be considered as the inverse of that applied by the pre-execution resample component 118. As a non-limiting example, if the pre-execution resample component 118 applies up-sampling (e.g., nearest neighbor interpolation, bilinear interpolation, cubic or bicubic interpolation) to the medical image 108, then the post-execution resample component 122 can apply down-sampling (e.g., box sampling, mipmap) to the output image 402. In such case, the pre-execution resample component 118 can be considered as increasing the number of pixels/voxels in the medical image 108, whereas the post-execution resample component 122 can be considered as decreasing the number of pixels/voxels in the output image 402. As another non-limiting example, if the pre-execution resample component 118 instead applies down-sampling (e.g., box sampling, mipmap) to the medical image 108, then the post-execution resample component 122 can apply up-sampling (e.g., nearest neighbor interpolation, bilinear interpolation, cubic or bicubic interpolation) to the output image 402. In such case, the pre-execution resample component 118 can be considered as decreasing the number of pixels/voxels in the medical image 108, whereas the post-execution resample component 122 can be considered as increasing the number of pixels/voxels in the output image 402. In this way, the post-execution resample component 122 can resample the output image 402, so that the resampled output image 602 exhibits the DFOV 110 (the spatial resolution 128) instead of the DFOV 106 (the spatial resolution 126). That is, because the DFOV 110 (the spatial resolution 128) and the DFOV 106 (the spatial resolution 126) can be known, the post-execution resample component 122 can arithmetically determine a magnitude of resampling (e.g., a magnitude of up-sampling or down-sampling) that would be sufficient to cause the resampled output image 602 to exhibit the DFOV 110 (the spatial resolution 128) instead of the DFOV 106 (the spatial resolution 126), and the post-execution resample component 122 can apply such magnitude of resampling to the output image 402, thereby yielding the resampled output image 602.

In various aspects, the resampled output image 602 can be considered as the result obtained by accurately performing the inferencing task on the medical image 108. As a non-limiting example, if the inferencing task is image quality enhancement, the resampled output image 602 can be considered as an inferred quality-enhanced version of the medical image 108. As another non-limiting example, if the inferencing task is image denoising, then the resampled output image 602 can be considered as an inferred denoised version of the medical image 108. As yet another non-limiting example, if the inferencing task is image kernel transformation, then the resampled output image 602 can be considered as an inferred kernel-transformed version of the medical image 108. As still another non-limiting example, if the inferencing task is image segmentation, then the resampled output image 602 can be considered as an inferred segmentation mask of the medical image 108.

In any case, the resampled output image 602 can lack inaccuracies/artefacts associated with DFOV mismatch (associated with spatial resolution mismatch). Indeed, as mentioned above, executing the deep learning neural network 104 directly on the medical image 108 would not yield an accurate inferencing result, due to the mismatch between the DFOV 110 (the spatial resolution 128) and the DFOV 106 (the spatial resolution 126). However, as described herein, such inaccuracy can be avoided/ameliorated by resampling (e.g., via 118) the medical image 108 to match the DFOV 106 (the spatial resolution 126), by executing (e.g., via 120) the deep learning neural network 104 on the resampled version of the medical image 108, and by resampling (e.g., via 122) back to the DFOV 110 (the spatial resolution 128) the result produced by the deep learning neural network 104. In this way, the inferencing task result (e.g., 602) associated with the medical image 108 can be obtained, and such result can be untainted/uncorrupted by inaccuracies/artefacts that would otherwise be caused by the mismatch between the DFOV 110 and the DFOV 106 (by the mismatch between the spatial resolution 128 and the spatial resolution 126).

Figure 8:
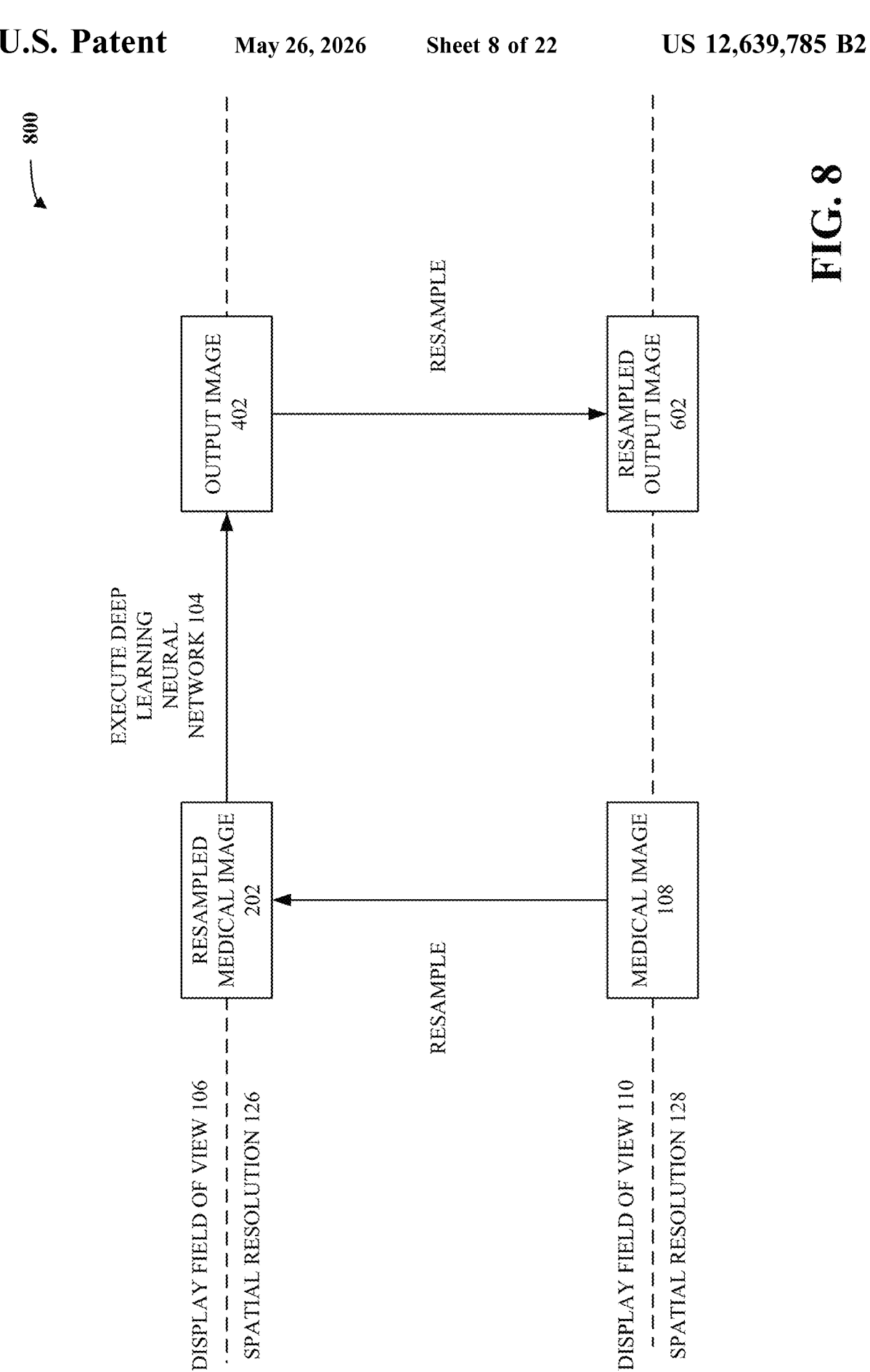
FIG. 8 illustrates an example, non-limiting block diagram showing how a medical image exhibiting a first display field of view, and thus a first spatial resolution, can be accurately analyzed by a deep learning neural network trained on a different display field of view, and thus a different spatial resolution, in accordance with one or more embodiments described herein.

FIG. 8 illustrates an example, non-limiting block diagram 800 showing how a medical image exhibiting a first display field of view, and thus a first spatial resolution, can be accurately analyzed by a deep learning neural network trained on a different display field of view, and thus a different spatial resolution, in accordance with one or more embodiments described herein. In other words, FIG. 8 helps to clarify various of the herein teachings.

In various embodiments, as shown, the medical image 108 can exhibit or otherwise have the DFOV 110 (the spatial resolution 128). As explained above, the DFOV 110 (the spatial resolution 128) can be different (e.g., more granular than or less granular than) the DFOV 106 (the spatial resolution 126) on which the deep learning neural network 104 has been trained.

In various aspects, as shown, the medical image 108 can be converted from the DFOV 110 (the spatial resolution 128) to the DFOV 106 (the spatial resolution 126) via resampling. Such resampling can yield the resampled medical image 202. In some cases, such resampling can be considered as importing the medical image 108 into the DFOV/resolution-space of the deep learning neural network 104.

In various instances, as further shown, the deep learning neural network 104 can be executed on the resampled medical image 202, thereby yielding the output image 402. Because the resampled medical image 202 can have/exhibit the DFOV 106 (the spatial resolution 126), the output image 402 can likewise have/exhibit the DFOV 106 (the spatial resolution 126).

In various cases, as also shown, the output image 402 can be converted from the DFOV 106 (the spatial resolution 126) back to the DFOV 110 (the spatial resolution 128) via resampling. Such resampling can yield the resampled output image 602. In some cases, such resampling can be considered as importing the output image 402 back into the DFOV/resolution-space of the medical image 108 (e.g., such resampling can be considered as the inverse of the resampling that is performed on the medical image 108).

As mentioned above, the output image 402 can be considered as the result of applying the inferencing task (e.g., image quality enhancement, image denoising, image kernel transformation, image segmentation) to the resampled medical image 202. In contrast, the resampled output image 602 can be considered as the result of applying the inferencing task to the medical image 108. Note that, because the resampled medical image 202 can have/exhibit the DFOV 106 (the spatial resolution 126), and because the deep learning neural network 104 can have been trained on the DFOV 106 (the spatial resolution 126), the output image 402 can be unaffected or uncorrupted by inaccuracies or imaging artefacts associated with DFOV (spatial resolution) mismatch. After all, there can be an absence of a DFOV mismatch (a spatial resolution mismatch) between the resampled medical image 202 and the deep learning neural network 104. Accordingly, because the output image 402 can be untainted/uncorrupted by inaccuracies/artefacts associated with DFOV (spatial resolution) mismatch, the resampled output image 602 can likewise be devoid of inaccuracies/artefacts associated with DFOV (spatial resolution) mismatch, notwithstanding that there can be a DFOV (spatial resolution) mismatch between the medical image 108 and the deep learning neural network 104. In other words, by resampling the medical image 108 to match the DFOV 106 (spatial resolution 126) prior to executing the deep learning neural network 104, the DFOV (spatial resolution) mismatch between the medical image 108 and the deep learning neural network 104 can be overcome (e.g., inaccuracies/artefacts caused by DFOV/spatial-resolution mismatch can be avoided or reduced).

In any case, the resampled output image 602 can be considered as a result obtained by applying the inferencing task to the medical image 108. In various embodiments, the result component 124 can accordingly take or initiate any suitable electronic actions based on the resampled output image 602. As a non-limiting example, the result component 124 can electronically transmit the resampled output image 602 (or any suitable portion thereof) to any suitable computing devices (not shown). As another non-limiting example, the result component 124 can electronically render, on any suitable computing displays (not shown), the resampled output image 602 (or any suitable portion thereof).

FIG. 9 illustrates a flow diagram of an example, non-limiting computer-implemented method 900 that can facilitate deep learning robustness against display field of view variations in accordance with one or more embodiments described herein. In various cases, the DFOV robustness system 102 can facilitate the computer-implemented method 900.

In various embodiments, act 902 can include accessing, by a device (e.g., via 116) operatively coupled to a processor, a deep learning neural network (e.g., 104) trained on a first DFOV or spatial resolution (e.g., 106 or 126) and a medical image (e.g., 108) exhibiting a second DFOV or spatial resolution (e.g., 110 or 128).

In various aspects, act 904 can include resampling, by the device (e.g., via 118), the medical image, such that the resampled version of the medical image (e.g., 202) exhibits the first DFOV or spatial resolution (e.g., 106 or 126) and not the second DFOV or spatial resolution (e.g., 110 or 128).

In various instances, act 906 can include executing, by the device (e.g., via 120), the deep learning neural network on the resampled version of the medical image. This can yield an output image (e.g., 402), where the output image can exhibit the first DFOV or spatial resolution (e.g., 106 or 126) and not the second DFOV or spatial resolution (e.g., 110 or 128).

In various aspects, act 908 can include resampling, by the device (e.g., via 122), the output image, such that the resampled version of the output image (e.g., 602) exhibits the second DFOV or spatial resolution (e.g., 110 or 128) and not the first DFOV or spatial resolution (e.g., 106 or 126).

In various instances, act 910 can include rendering, by the device (e.g., via 124), the resampled version of the output image on a computing display, or transmitting, by the device (e.g., via 124), the resampled version of the output image to a computing device.

Thus far, various embodiments have been described in which the medical image 108 is resampled to match the DFOV (spatial resolution) on which the deep learning neural network 104 has been trained. However, note that, as the DFOV 110 (spatial resolution 128) gets farther away from the DFOV 106 (spatial resolution 126), resampling the medical image 108, executing the deep learning neural network 104 on the resampled medical image 202, and resampling the output image 402 can involve a growing amount of computational complexity (e.g., exponential explosion of the number of pixels/voxels). In various instances, such growing computational complexity can be ameliorated by having multiple trained deep learning neural networks from which to choose and by choosing whichever trained deep learning neural network has a more granular DFOV that is closest to that of the medical image 108. Various of such embodiments are described with respect to FIGS. 10-12.

Figure 10:
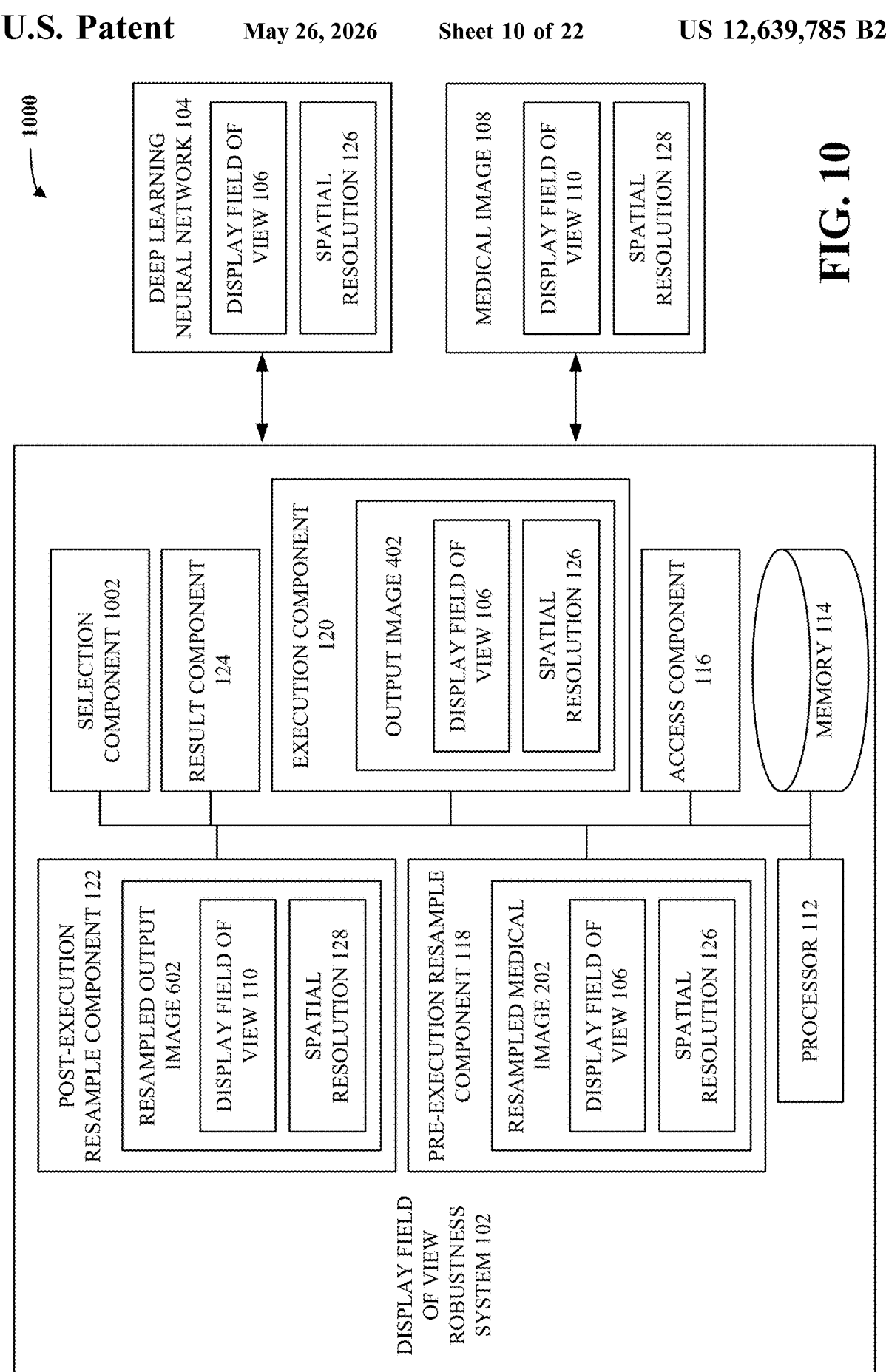
FIG. 10 illustrates a block diagram of an example, non-limiting system including a selection component that facilitates deep learning robustness against display field of view variations in accordance with one or more embodiments described herein.

FIG. 10 illustrates a block diagram of an example, non-limiting system 1000 including a selection component that can facilitate deep learning robustness against display field of view variations in accordance with one or more embodiments described herein. As shown, the system 1000 can, in some cases, comprise the same components as the system 600, and can further comprise a selection component 1002.

In various embodiments, the selection component 1002 can electronically store, electronically maintain, or otherwise electronically access a deep learning neural network vault. In various aspects, the deep learning neural network vault can be considered as a collection of any suitable number of deep learning neural networks, each of which can be (can have been) trained on a different DFOV (on a different spatial resolution). In various instances, prior to the pre-execution resample component 118 resampling the medical image 108, the selection component 1002 can electronically select the deep learning neural network 104 from the deep learning neural network vault, based on the DFOV 110 (the spatial resolution 128). This is explained more with respect to FIG. 11.

Figure 11:
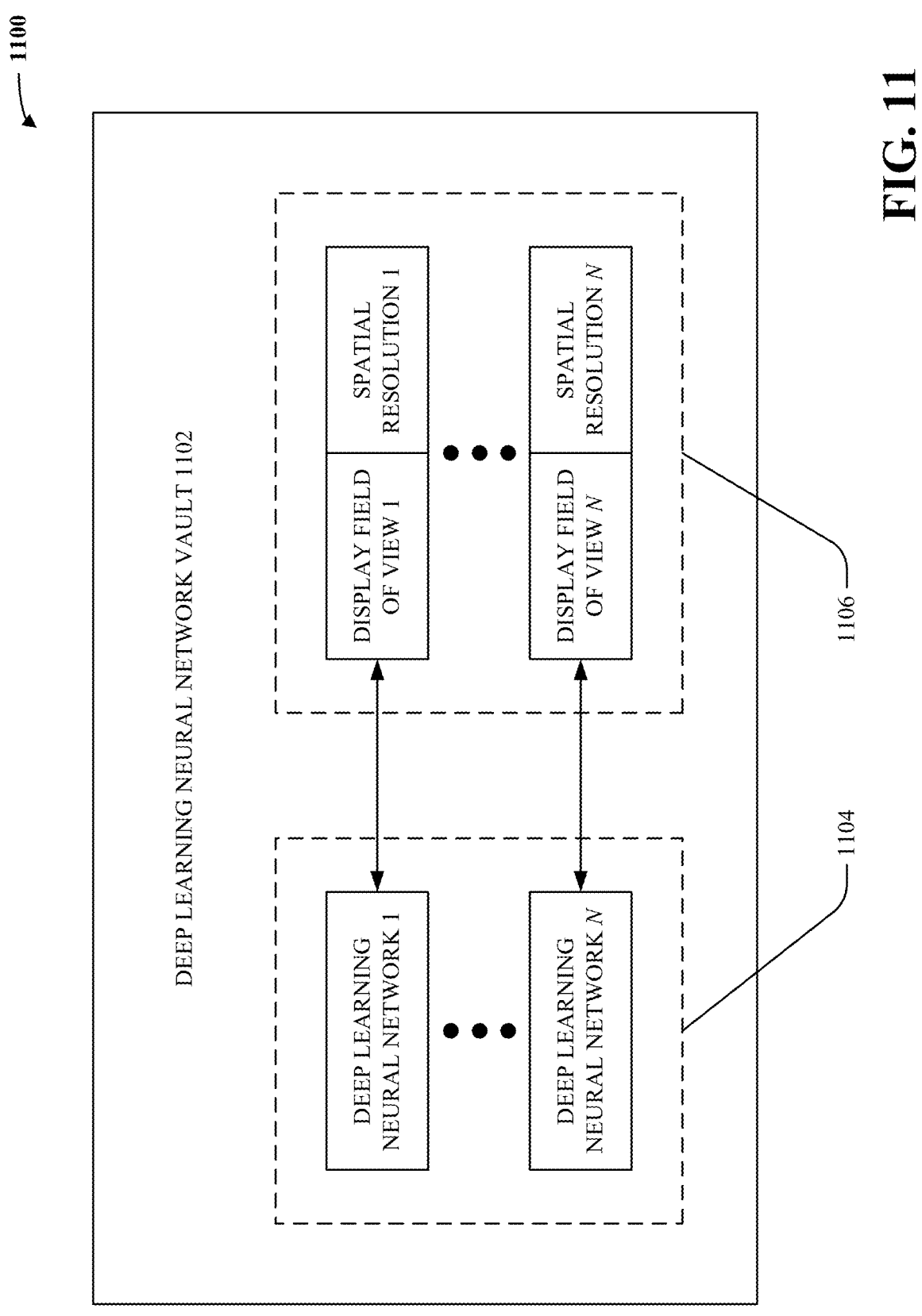
FIG. 11 illustrates an example, non-limiting block diagram of a deep learning neural network vault in accordance with one or more embodiments described herein.

FIG. 11 illustrates an example, non-limiting block diagram 1100 of a deep learning neural network vault 1102 in accordance with one or more embodiments described herein.

In various embodiments, as shown, the deep learning neural network vault 1102 can include a set of deep learning neural networks 1104 and a set of DFOVs or spatial resolutions 1106. In various aspects, the set of deep learning neural networks 1104 can include n networks, for any suitable positive integer n: a deep learning neural network 1 to a deep learning neural network n. In various instances, different ones of the set of deep learning neural networks 1104 can have the same or different architectures as each other. In any case, each of the set of deep learning neural networks 1104 can be configured/trained to perform the same inferencing task as the deep learning neural network 104. Indeed, in various aspects, the deep learning neural network 104 can be one of the set of deep learning neural networks 1104.

In various aspects, as shown, the set of DFOVs or spatial resolutions 1106 can respectively correspond (e.g., in one-to-one fashion) to the set of deep learning neural networks 1104. Accordingly, since the set of deep learning neural networks 1104 can have n networks, the set of DFOVs or spatial resolutions 1106 can likewise have n DFOVs or spatial resolutions: a display field of view 1 (hereafter "DFOV 1") and a spatial resolution 1 to a display field of view n (hereafter "DFOV n") and a spatial resolution n. In various instances, different ones of the set of DFOVs or spatial resolutions 1106 can be different from each other. That is, each of the set of DFOVs or spatial resolutions 1106 can represent a unique pixel/voxel granularity.

In various aspects, each of the set of deep learning neural networks 1104 can be (can have been) trained on a respective one of the set of DFOVs or spatial resolutions 1106. As a non-limiting example, the deep learning neural network 1 can correspond to the DFOV 1 (the spatial resolution 1), which can mean that the deep learning neural network 1 can have been trained on the DFOV 1 (the spatial resolution 1). As another non-limiting example, the deep learning neural network n can correspond to the DFOV n (the spatial resolution n), which can mean that the deep learning neural network n can have been trained on the DFOV n (the spatial resolution n). In various instances, as mentioned above, the deep learning neural network 104 can be within the set of deep learning neural networks 1104. Accordingly, the DFOV 106 (the spatial resolution 126) can be whichever one of the set of DFOVs or spatial resolutions 1106 corresponds to the deep learning neural network 104.

In various aspects, the access component 116 can electronically receive, retrieve, or otherwise access the medical image 108, which can exhibit the DFOV 110 (spatial resolution 128). In various instances, the selection component 1002 can search for the DFOV 110 (the spatial resolution 128) in the set of DFOVs or spatial resolutions 1106. If the DFOV 110 (the spatial resolution 128) is in (e.g., is an element of) the set of DFOVs or spatial resolutions 1106, then the selection component 1002 can select whichever of the set of deep learning neural networks 1104 corresponds to the DFOV 110 (to the spatial resolution 128), and such selected deep learning neural network can be considered as the deep learning neural network 104. In such case, the DFOV 110 (the spatial resolution 128) can be considered as being equal to the DFOV 106 (to the spatial resolution 126), meaning that pre-execution resampling and post-execution resampling can be omitted.

On the other hand, if the DFOV 110 (the spatial resolution 128) is not in (e.g., is not an element of) the set of DFOVs or spatial resolutions 1106, then the selection component 1002 can select whichever of the set of DFOVs or spatial resolutions 1106 is more granular than and nearest in magnitude to the DFOV 110 (to the spatial resolution 128). In various cases, such selected DFOV (spatial resolution) can be considered as the DFOV 106 (the spatial resolution 126), and the selection component 1002 can select, as the deep learning neural network 104, whichever of the set of deep learning neural networks 1104 corresponds to the DFOV 106 (to the spatial resolution 126). In this way, the selection component 1002 can be considered as identifying as the deep learning neural network 104 whichever of the set of deep learning neural networks 1104 has been trained on a DFOV (spatial resolution) that is more granular than and closest to the DFOV 110 (to the spatial resolution 128). This can help to reduce an amount of computational complexity involved in resampling the medical image 108, in executing the deep learning neural network 104, or in resampling the output image 402.

FIG. 12 illustrates a flow diagram of an example, non-limiting computer-implemented method 1200 that can facilitate deep learning robustness against display field of view variations in accordance with one or more embodiments described herein. In various cases, the DFOV robustness system 102 can facilitate the computer-implemented method 1200.

In various embodiments, act 1202 can include accessing, by a device (e.g., via 116) operatively coupled to a processor, a medical image (e.g., 108) exhibiting a given DFOV or given spatial resolution (e.g., 110 or 128).

In various aspects, act 1204 can include accessing, by the device (e.g., via 1002), a set of deep learning neural networks (e.g., 1104) that have been respectively trained on a set of DFOVs or spatial resolutions (e.g., 1106).

In various instances, act 1206 can include determining, by the device (e.g., via 1002), whether the given DFOV or given spatial resolution is present (e.g., is an explicitly-named element of) the set of DFOVs or spatial resolutions. If so, the computer-implemented method 1200 can proceed to act 1208. If not, the computer-implemented method 1200 can instead proceed to act 1212.

In various cases, act 1208 can include selecting, from the set of deep learning neural networks, a deep learning neural network (e.g., 104) that has been trained on the given DFOV or given spatial resolution (e.g., in such case, the DFOV 106 (the spatial resolution 126) can be equal to the DFOV 110 (the spatial resolution 128)).

In various aspects, act 1210 can include executing, by the device (e.g., via 120), the selected deep learning neural network (selected at 1208) on the medical image (e.g., if the DFOV 110 (the spatial resolution 128) is already equal to the DFOV 106 (the spatial resolution 126), then resampling the medical image 108 prior to execution of the deep learning neural network 104 can be omitted).

In various instances, act 1212 can include identifying, by the device (e.g., via 1002) and in the set of DFOVs or spatial resolutions, a DFOV or spatial resolution (e.g., 106 or 126) that is more granular than and nearest to the given DFOV or given spatial resolution (e.g., in such case, the DFOV 106

(the spatial resolution 126) can be not equal to the DFOV 110 (the spatial resolution 128)).

In various cases, act 1214 can include selecting, by the device (e.g., via 1002) and from the set of deep learning neural networks, a deep learning neural network (e.g., 104) that has been trained on the identified DFOV or identified spatial resolution (e.g., 106 or 126).

In various aspects, act 1216 can include resampling (e.g., up-sampling), by the device (e.g., via 118), the medical image, such that the resampled version of the medical image (e.g., 202) exhibits the identified DFOV or identified spatial resolution (e.g., 106 or 126) instead of the given DFOV or given spatial resolution (e.g., 110 or 128).

In various instances, act 1218 can include executing, by the device (e.g., via 120), the selected deep learning neural network (selected at 1214) on the resampled version of the medical image.

In various embodiments, down-sampling the medical image 108 can be considered as a lossy operation (e.g., information can be lost due to reducing the number of pixels/voxels). Accordingly, in some aspects, it can be desirable for the pre-execution resample component 118 to avoid down-sampling the medical image 108. As explained above, this can be achieved when the DFOV 106 (the spatial resolution 126) is more granular than the DFOV 110 (the spatial resolution 128). After all, in such case, the pre-execution resample component 118 can apply an up-sampling technique (as opposed to a down-sampling technique) to the medical image 108, so as to cause the resampled medical image 202 to exhibit the DFOV 106 (the spatial resolution 126). In situations where the DFOV 106 (the spatial resolution 126) is less granular than the DFOV 110 (the spatial resolution 128), avoidance of down-sampling can be achieved by selecting, via the selection component 1002 and from the deep learning neural network vault 1102, a deep learning neural network that has been trained on a more granular DFOV (a more granular spatial resolution).

However, in some cases, it can be possible that the DFOV 110 (the spatial resolution 128) is more granular than all of the set of DFOVs or spatial resolutions 1106. In such case, the pre-execution resample component 118 can be unable to avoid applying a down-sampling technique to the medical image 108. However, in various aspects as described with respect to FIGS. 13-15, information losses associated with such down-sampling can be reduced or eliminated, when the most granular DFOV or most granular spatial resolution in the set of DFOVs or spatial resolutions 1106 is derived from a maximum cut-off frequency of a modulation transfer function of the medical imaging device that captured/generated the medical image 108.

Figure 14:
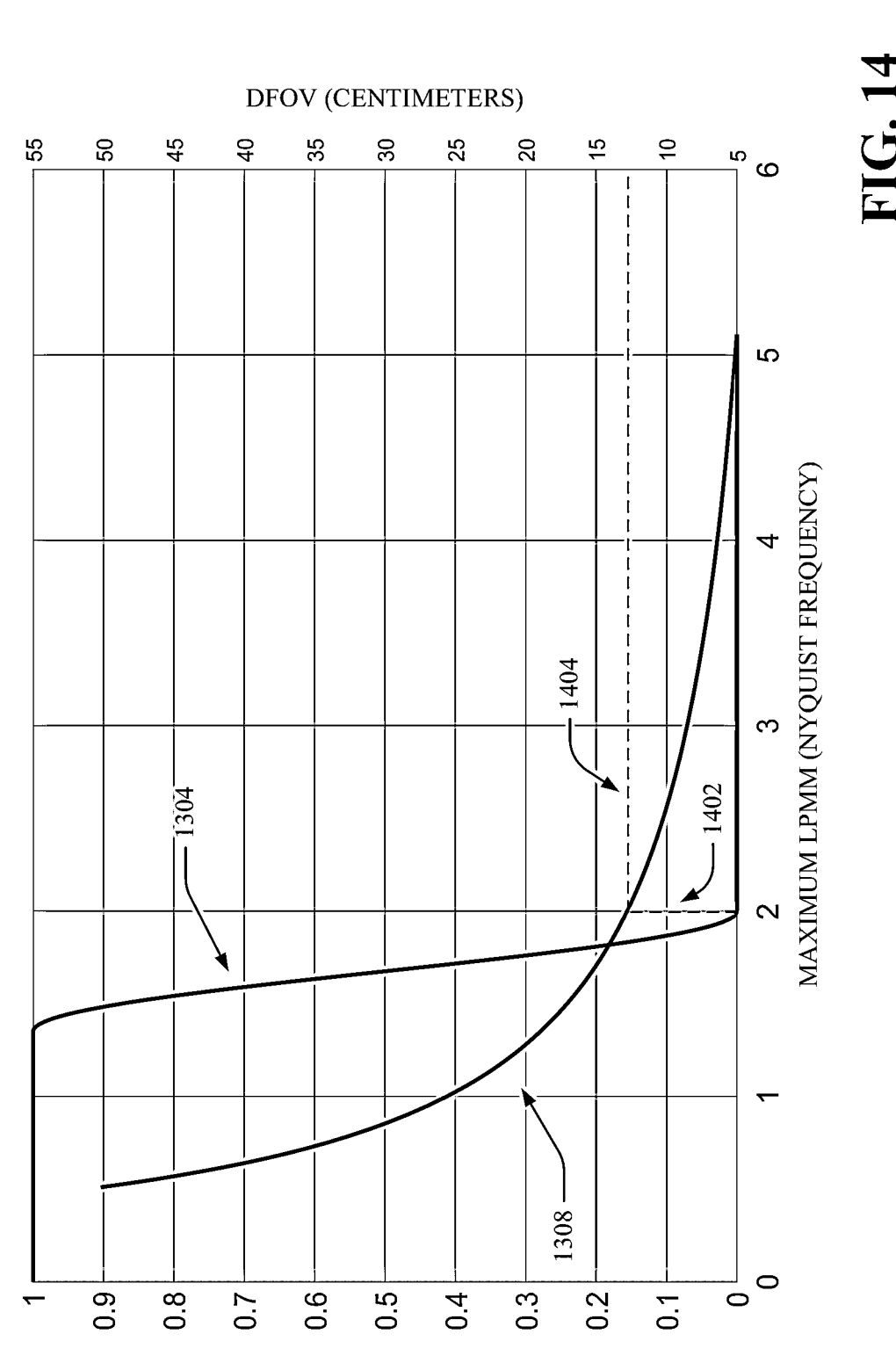

FIGS. 13-14 illustrate example, non-limiting graphs pertaining to maximum cut-off frequencies of modulation transfer functions in accordance with one or more embodiments described herein.

Consider FIG. 13. As shown, FIG. 13 illustrates a graph 1302. In various aspects, the graph 1302 can be considered as representing a non-limiting, example modulation transfer function (MTF) of the medical imaging device that captured/generated the medical image 108. In various instances, an abscissa axis of the graph 1302 can represent line-pairs per millimeter (LPMM), which can be considered as a spatial scanning frequency of the medical imaging device. In various cases, an ordinate axis of the graph 1302 can represent signal amplitude captured/generated by the medical imaging device. In various aspects, a curve 1304 can be plotted in the graph 1302, where such curve can be considered as indicating the modulation transfer function of the medical imaging device (e.g., as indicating how signal amplitude of the medical imaging device can change based on LPMM). As shown in the non-limiting example of FIG. 13, the curve 1304 can be considered as having a maximum cut-off frequency at an LPMM of 2 (e.g., signal amplitude is at or near zero for LPMMs above 2).

As also shown, FIG. 13 illustrates a graph 1306. In various aspects, the graph 1306 can be considered as representing a non-limiting, example relationship between DFOV (spatial resolution) and LPMM. In various instances, an abscissa axis of the graph 1306 can represent LPMM, and an ordinate axis of the graph 1306 can represent DFOV (spatial resolution). In particular, a curve 1308 can be plotted in the graph 1306, where such curve can be considered as indicating a most granular DFOV (a most granular spatial resolution) that can be achieved at any given LPMM. Equivalently, the curve 1308 can be considered as indicating a maximum permissible LPMM (also referred to as a Nyquist frequency) for any given DFOV (for any given spatial resolution). In various aspects, the curve 1308 can be obtained formulaically. More specifically, spatial resolution along a given dimension at a given DFOV can be obtained by dividing the given DFOV by the total number of pixels/voxels along that given dimension, sampling frequency at the given DFOV can be obtained as the reciprocal of the spatial resolution at the given DFOV, and Nyquist frequency (maximum LPMM) at the given DFOV can be equal to half of the sampling frequency.

Now consider FIG. 14. As shown, FIG. 14 illustrates a graph 1400 in which the curve 1304 and the curve 1308 are superimposed on each other. As mentioned above, the curve 1304 can be considered as showing that the MTF of the medical imaging device has a maximum cut-off frequency at an LPMM of 2 (in this non-limiting example). As shown by a numeral 1402 and a numeral 1404, the curve 1308 can yield a DFOV of about 13 cm for such maximum cut-off frequency (e.g., for an LPMM of 2). In other words, a DFOV (spatial resolution) of 13 cm can be considered as the most granular DFOV (most granular spatial resolution) that can be supported by the medical imaging device when the MTF of the medical imaging device has a maximum cut-off frequency of 2. In still other words, because an LPMM of 2 can be considered as the maximum cut-off frequency of the MTF of the medical imaging device, the medical imaging device cannot reliably capture information at a DFOV (spatial resolution) that is more granular than 13 cm. In even other words, an attempt by the medical imaging device to capture information at a DFOV (spatial resolution) more granular than 13 cm can be considered as yielding no more useful information than what would have been captured at a DFOV of 13 cm. In such non-limiting example, if the DFOV 110 (spatial resolution 128) is more granular than 13 cm, then the medical image 108 can be down-sampled to a DFOV (spatial resolution) of 13 cm without loss of information. That is, down-sampling in such case can be considered as not being a lossy operation. Accordingly, in such non-limiting example, if the deep learning neural network vault 1102 includes a deep learning neural network that has been trained on a DFOV (spatial resolution) of 13 cm, then losses associated with down-sampling can be avoided.

It should be understood that any specific numbers (e.g., 13 cm, LPMM of 2) presented above (or anywhere else herein) are non-limiting.

More generally, in various aspects, the deep learning neural network vault 1102 can include a deep learning neural network that has been trained on a DFOV (a spatial resolution) that corresponds to a maximum cut-off frequency of a modulation transfer function of the medical image device that generates/captures the medical image 108. As explained above, such DFOV (spatial resolution) can be identified/determined by: empirically measuring the modulation transfer function (MTF) of the medical imaging device that captures/generates the medical image 108; identifying the maximum cut-off frequency of the MTF (e.g., identifying the LPMM value at which the MTF is band-limited); and computing, based on the Nyquist frequency formulation described above, the most granular DFOV (the most granular spatial resolution) that can be supported at the maximum cut-off frequency. When the deep learning neural network vault 1102 includes a deep learning neural network that has been trained on a DFOV that corresponds to such a maximum cut-off frequency, information losses associated with down-sampling can be avoided.

FIG. 15 illustrates a flow diagram of an example, non-limiting computer-implemented method 1500 that can facilitate deep learning robustness against display field of view variations based on maximum cut-off frequency of a modulation transfer function in accordance with one or more embodiments described herein. In various cases, the DFOV robustness system 102 can facilitate the computer-implemented method 1500.

In various aspects, act 1502 can include accessing, by a device (e.g., via 114) operatively coupled to a processor, a deep learning neural network (e.g., 104) that has been trained on a first DFOV or first spatial resolution (e.g., 106 or 126). In various cases, the first DFOV or first spatial resolution can correspond to a maximum cut-off frequency of a modulation transfer function of a medical imaging device (e.g., as shown with respect to FIGS. 13-14). Because the first DFOV or first spatial resolution can correspond to the maximum cut-off frequency of the modulation transfer function of the medical imaging device, the first DFOV or first spatial resolution can be considered as being the most granular DFOV or most granular spatial resolution that can be supported by the medical imaging device.

In various instances, act 1504 can include accessing, by the device (e.g., via 114), a medical image (e.g., 108) generated by the medical imaging device. In various cases, the medical image can exhibit a second DFOV or second spatial resolution.

In various aspects, act 1506 can include determining, by the device (e.g., via 118), whether the second DFOV or second spatial resolution is more granular than the first DFOV or first spatial resolution. If so, then the computer-implemented method 1500 can proceed to act 1508. If not, then the computer-implemented method 1500 can proceed to act 1512.

In various aspects, act 1508 can include down-sampling, by the device (e.g., via 118), the medical image, such that the down-sampled version (e.g., 202) of the medical image exhibits the first DFOV or first spatial resolution. Note that, because the first DFOV or the first spatial resolution can correspond to the maximum cut-off frequency of the modulation transfer function of the medical imaging device, such down-sampling can be considered as not being a lossy operation. In other words, even though the second DFOV or second spatial-resolution can nominally be more granular than the first DFOV or first spatial resolution, the medical image can actually contain no more granular information than would have been captured at the first DFOV or first spatial-resolution, and so down-sampling to the first DFOV or first spatial resolution can be considered as losing no information.

In various instances, act 1510 can include executing, by the device (e.g., via 120), the deep learning neural network on the down-sampled version of the medical image.

In various aspects, act 1512 can include up-sampling, by the device (e.g., via 118), the medical image, such that the up-sampled version (e.g., 202) of the medical image exhibits the first DFOV or first spatial resolution.

In various instances, act 1514 can include executing, by the device (e.g., via 120), the deep learning neural network on the up-sampled version of the medical image.

Figure 16:
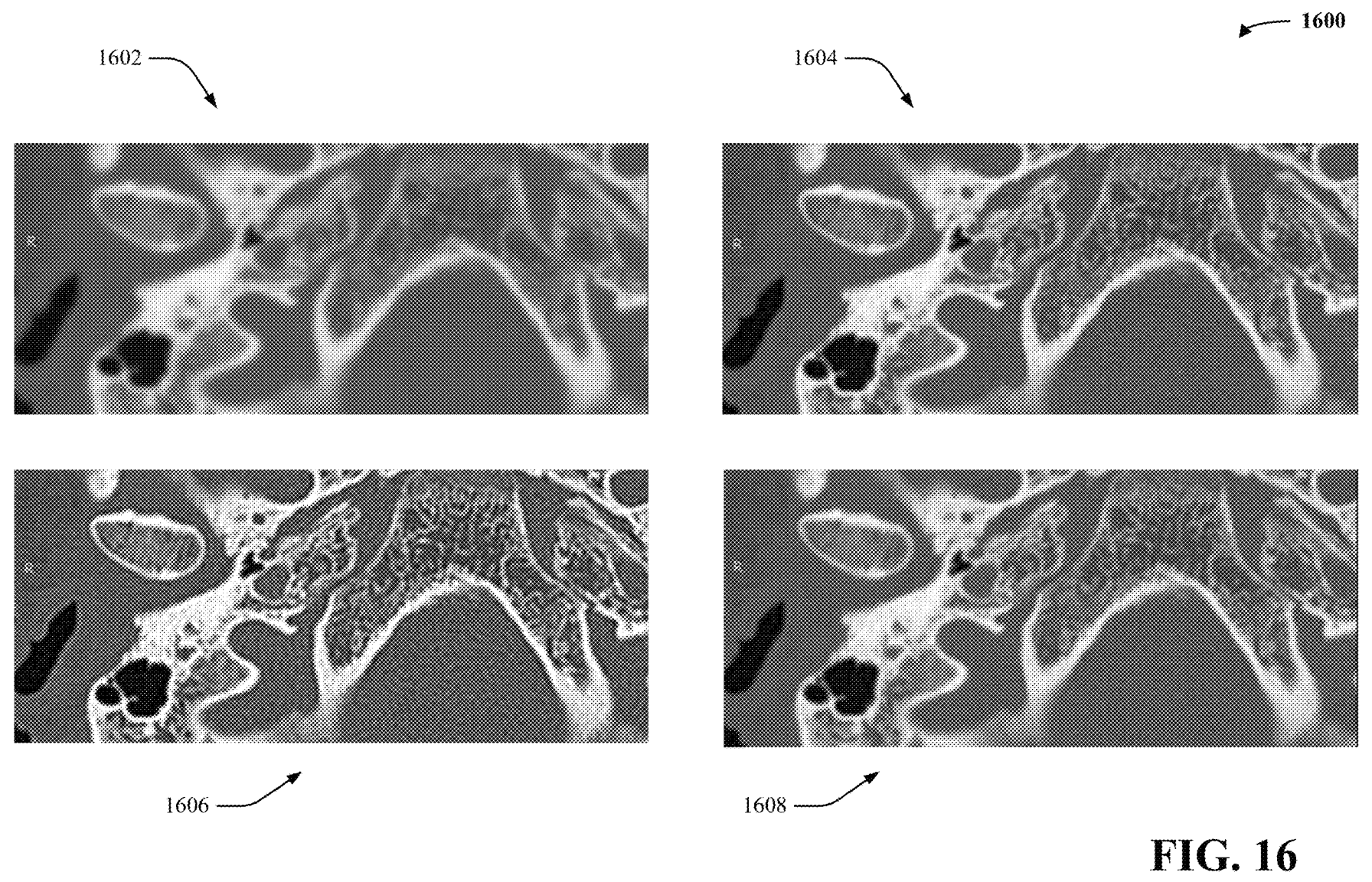
Figure 17:
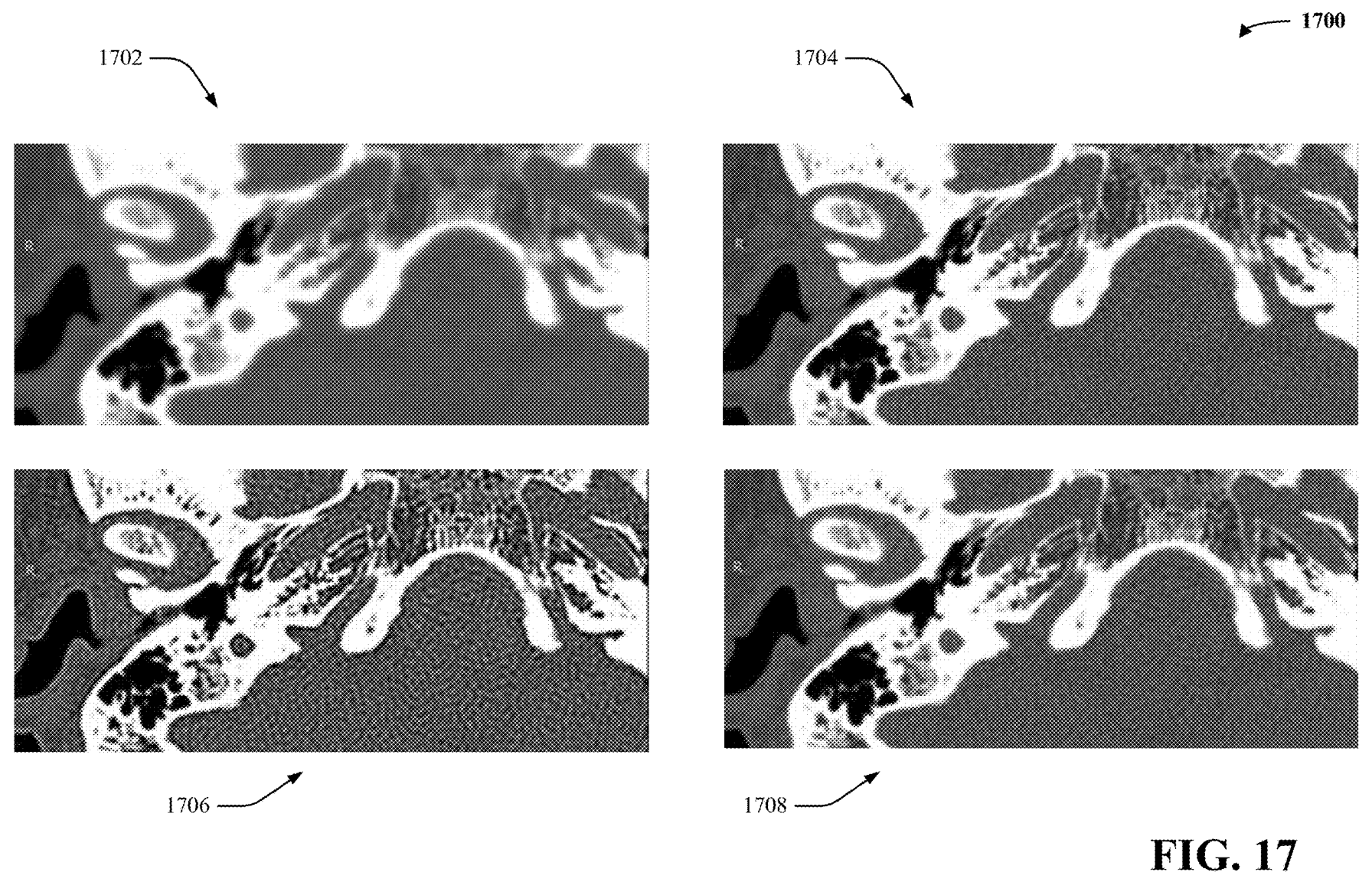
Figure 18:
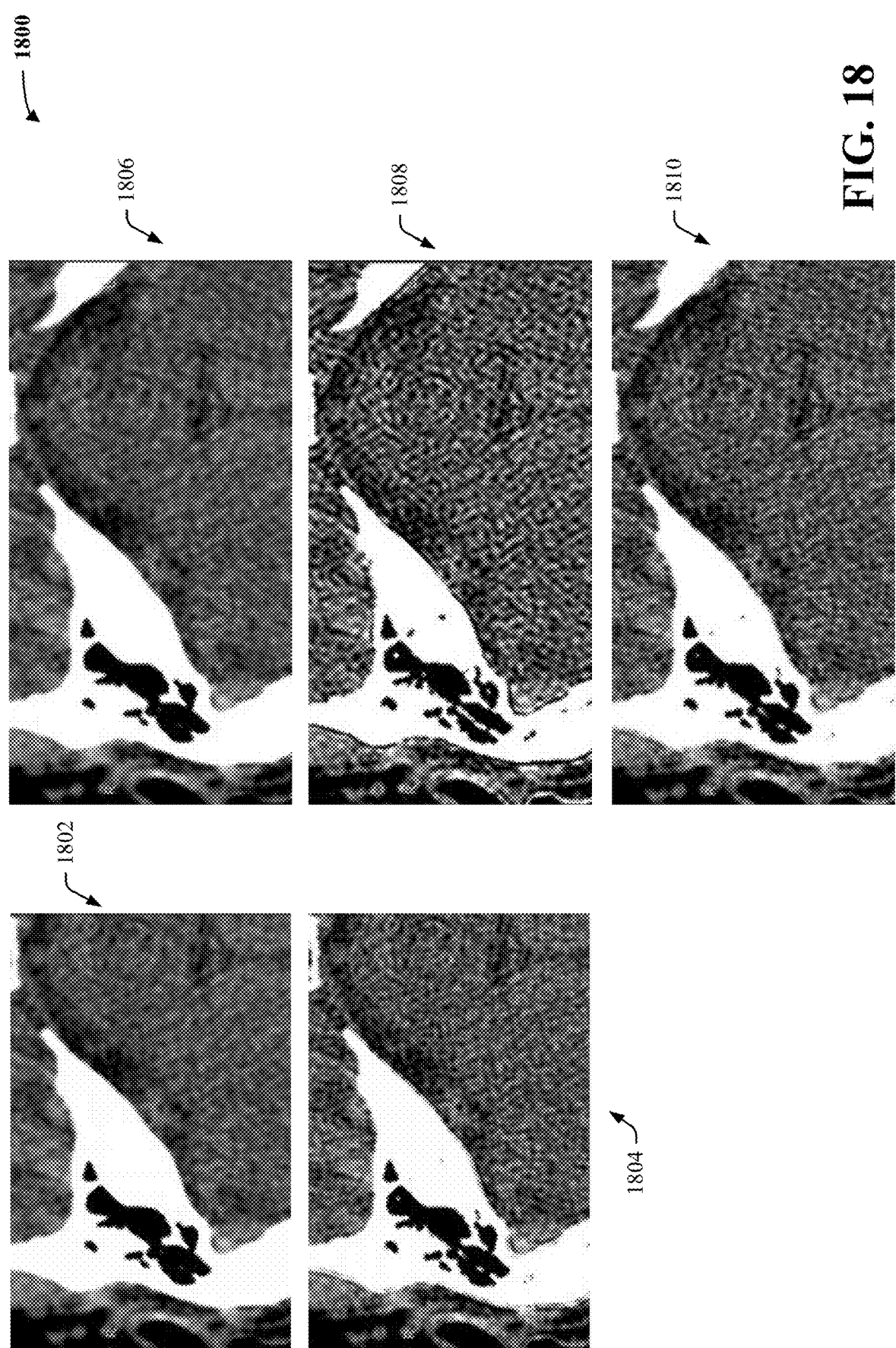

FIGS. 16-18 illustrate example, non-limiting experimental results demonstrating various benefits of one or more embodiments described herein.

Consider FIG. 16. FIG. 16 shows various CT images 1600 that help to demonstrate benefits of various embodiments described herein. In particular, FIG. 16 shows a CT scanned image 1602 of an anatomical structure of a medical patient. The CT scanned image 1602 was captured/generated according to a soft-tissue kernel. Accordingly, it can be desirable to perform image kernel transformation on the CT scanned image 1602, so that a version of the CT scanned image 1602 according to a bone kernel can be obtained. Although not explicitly shown in FIG. 16, the CT scanned image 1602 was captured/generated according to a DFOV of 15 cm. Note that the spatial resolution of the CT scanned image 1602 along any given dimension can be obtained by dividing 15 cm by the number of pixels that extend along that given dimension.

In various aspects, FIG. 16 also shows a CT image 1604. In various instances, the CT image 1604 can be considered as a ground-truth kernel-transformed version of the CT scanned image 1602. In various cases, the CT image 1604 was generated using an analytical bone kernel transformation technique.

In various aspects, FIG. 16 further shows a CT image 1606 and a CT image 1608. In various instances, a deep learning neural network was trained to perform bone kernel transformation, and both the CT image 1606 and the CT image 1608 were generated by such deep learning neural network based on the CT scanned image 1602. However, the deep learning neural network was trained on a DFOV of 10 cm, which does not match the DFOV of 15 cm exhibited by the CT scanned image 1602. In various aspects, the deep learning neural network was executed directly on the CT scanned image 1602, and the result of such direct execution was the CT image 1606. In various other aspects, the CT scanned image 1602 was up-sampled to match the DFOV of 10 cm, the deep learning neural network was executed on that up-sampled CT image, and the result outputted by the deep learning neural network was down-sampled back to a DFOV of 15 cm, thereby yielding the CT image 1608. As can be seen, the CT image 1606 can be considered as overdone. That is, the CT image 1606 can be considered as being filled with many imaging artefacts caused by the mismatch between the DFOV of the CT scanned image 1602 and the DFOV of the deep learning neural network. In stark contrast, the CT image 1608 can be considered as not overdone. Indeed, the CT image 1608 appears to be quite a good match with the CT image 1604 (e.g., appears to be quite a good match with the ground-truth). Accordingly, even though the deep learning neural network was trained on a DFOV of 10 cm and the CT scanned image 1602 was captured/generated according to a DFOV of 15 cm, the deep learning neural network was nevertheless able to be accurately executed due to the DFOV-based (spatial-resolution-based) pre-execution and post-execution resampling operations described herein. Such experimental results help to demonstrate a technical benefit of various embodiments described herein.

Now, consider FIG. 17. FIG. 17 shows various CT images 1700 that also help to demonstrate benefits of various embodiments described herein. Specifically, FIG. 17 shows a CT scanned image 1702 of an anatomical structure of a medical patient. Again, the CT scanned image 1702 was captured according to a soft-tissue kernel, thereby meriting a bone kernel transformation. Just as with FIG. 16, the CT scanned image 1702 was captured/generated according to a DFOV of 15 cm.

In various aspects, FIG. 17 also shows a CT image 1704, which can be considered as a ground-truth kernel-transformed version of the CT scanned image 1702. Again, the CT image 1704 was generated using an analytical bone kernel transformation technique.

In various aspects, FIG. 17 further shows a CT image 1706 and a CT image 1708. As mentioned above, a deep learning neural network was trained to perform bone kernel transformation, and both the CT image 1706 and the CT image 1708 were generated by such deep learning neural network based on the CT scanned image 1702. However, the deep learning neural network was trained on a DFOV of 10 cm, instead of a DFOV of 15 cm. In various aspects, the deep learning neural network was executed directly on the CT scanned image 1702, thereby yielding the CT image 1706. In various other aspects, the CT scanned image 1702 was up-sampled to match the DFOV of 10 cm, the deep learning neural network was executed on that up-sampled CT image, and the result outputted by the deep learning neural network was down-sampled back to a DFOV of 15 cm, thereby yielding the CT image 1708. As can be seen, the CT image 1706 can be considered as overdone (e.g., as being filled with many imaging artefacts caused by the mismatch between the DFOV of the CT scanned image 1702 and the DFOV of the deep learning neural network). In stark contrast, the CT image 1708 can be considered as not overdone. Indeed, the CT image 1708 appears to closely match the CT image 1704 (e.g., appears to closely match the ground-truth). Accordingly, even though the deep learning neural network was trained on a DFOV of 10 cm and the CT scanned image 1702 was captured/generated according to a DFOV of 15 cm, the deep learning neural network was nevertheless able to be accurately executed due to the DFOV-based (spatial-resolution-based) pre-execution and post-execution resampling operations described herein. Again, such experimental results help to demonstrate a technical benefit of various embodiments described herein.

Now, consider FIG. 18. FIG. 18 shows various CT images 1800 that further help to demonstrate benefits of various embodiments described herein. In particular, FIG. 18 shows a CT scanned image 1802 of an anatomical structure of a medical patient as captured according to a DFOV of 10 cm. FIG. 18 also shows a CT scanned image 1806 of that same anatomical structure of that same medical patient as captured according to a DFOV of 15 cm.

A deep learning neural network was trained to perform image quality enhancement, using a DFOV of 10 cm. In various aspects, the deep learning neural network was executed directly on the CT scanned image 1802, thereby yielding a CT image 1804. As can be seen, the CT image 1804 can lack significant imaging artefacts, since the DFOV of the CT scanned image 1802 matched that of the deep learning neural network (e.g., both had a DFOV of 10 cm).

In various instances, the deep learning neural network was executed directly on the CT scanned image 1806, thereby yielding a CT image 1808. As can be seen, the CT image 1808 possesses significant imaging artefacts, due to the DFOV mismatch between the CT scanned image 1806 (e.g., 15 cm) and the deep learning neural network (e.g., 10 cm).

In various other instances, the CT scanned image 1806 was up-sampled to match a DFOV of 10 cm, the deep learning neural network was executed on that up-sampled CT image, and the result produced by the deep learning neural network was down-sampled back to a DFOV of 15 cm, thereby yielding a CT image 1810. As can be seen, the CT image 1810 lacks significant imaging artefacts, notwithstanding the DFOV mismatch between the CT scanned image 1806 and the deep learning neural network. Indeed, as can further be seen, the visual quality of the CT image 1810 closely resembles that of the CT image 1804, which was generated in the absence of a DFOV mismatch. Again, these results help to demonstrate a technical benefit of various embodiments described herein (e.g., the deep learning neural network can be accurately executed, notwithstanding a DFOV (spatial resolution) mismatch).

Figure 19:
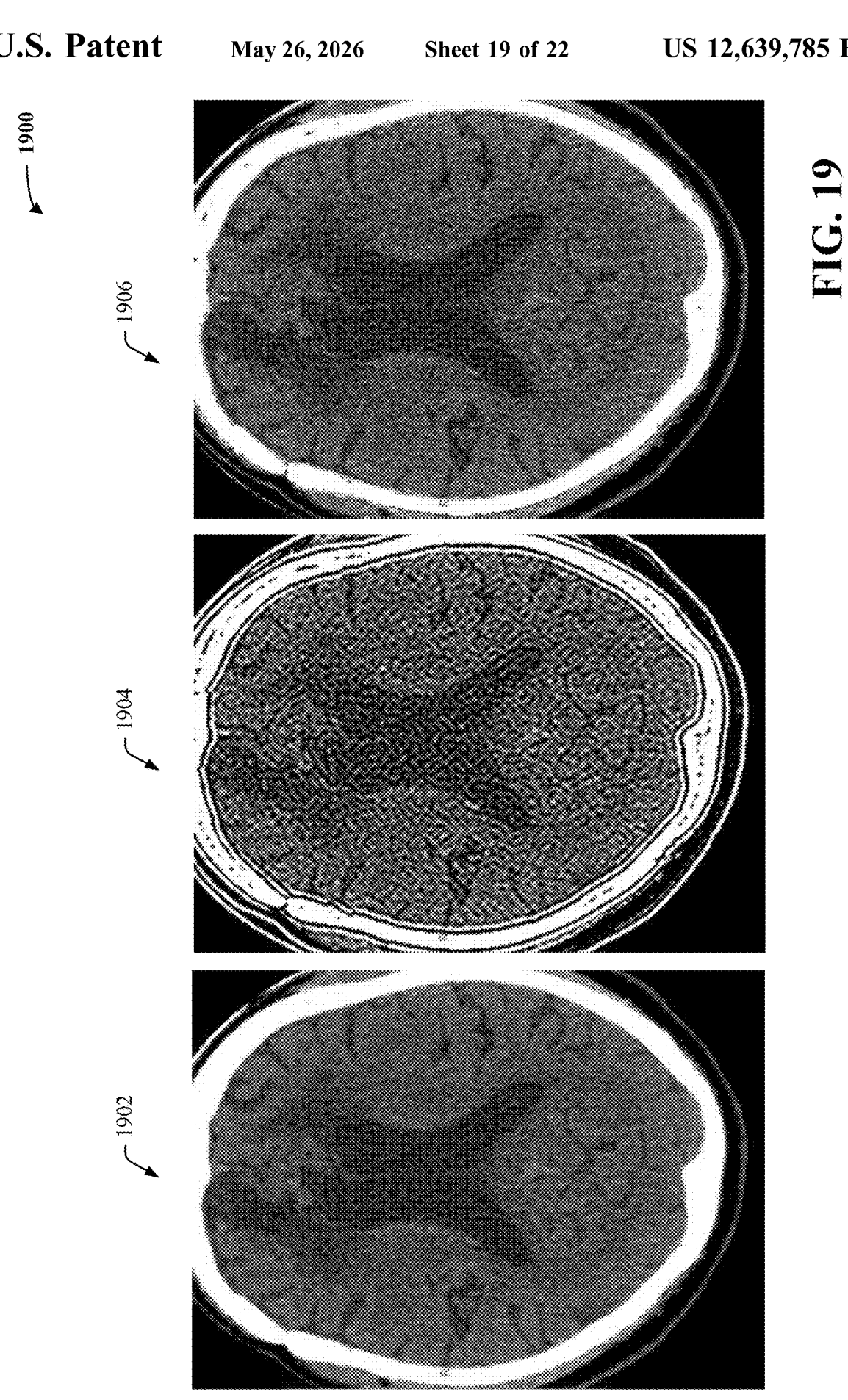

Now, consider FIG. 19. FIG. 19 shows various CT images 1900 that further help to demonstrate benefits of various embodiments described herein. Specifically, FIG. 19 shows a CT scanned image 1902 of an anatomical structure of a medical patient. The CT scanned image 1902 was captured/generated according to a DFOV of 25 cm.

In various aspects, FIG. 19 further shows a CT image 1904 and a CT image 1906. As mentioned above, a deep learning neural network was trained to perform image quality enhancement, and both the CT image 1904 and the CT image 1906 were generated by such deep learning neural network based on the CT scanned image 1902. However, the deep learning neural network was trained on a DFOV of 10 cm, instead of a DFOV of 25 cm. In various aspects, the deep learning neural network was executed directly on the CT scanned image 1902, thereby yielding the CT image 1904. In various other aspects, the CT scanned image 1902 was up-sampled to match the DFOV of 10 cm, the deep learning neural network was executed on that up-sampled CT image, and the result outputted by the deep learning neural network was down-sampled back to a DFOV of 25 cm, thereby yielding the CT image 1906. As can be seen, the CT image 1904 can be considered as overdone (e.g., as being filled with many imaging artefacts caused by the mismatch between the DFOV of the CT scanned image 1902 and the DFOV of the deep learning neural network). In stark contrast, the CT image 1906 can be considered as not overdone, despite the DFOV mismatch between the DFOV of the CT scanned image 1902 and the DFOV of the deep learning neural network. Accordingly, even though the deep learning neural network was trained on a DFOV of 10 cm and the CT scanned image 1902 was captured/generated according to a DFOV of 25 cm, the deep learning neural network was nevertheless able to be accurately executed due to the DFOV-based (spatial-resolution-based) pre-execution and post-execution resampling operations described herein. Again, such experimental results help to demonstrate a technical benefit of various embodiments described herein.

FIG. 20 illustrates a flow diagram of an example, non-limiting computer-implemented method 2000 that can facilitate deep learning robustness against display field of view variations in accordance with one or more embodiments described herein. In various cases, the DFOV robustness system 102 can facilitate the computer-implemented method 2000.

In various embodiments, act 2002 can include accessing, by a device (e.g., via 116) operatively coupled to a processor, a deep learning neural network (e.g., 104) and a medical image (e.g., 108). In various cases, a first spatial resolution (e.g., 126) on which the deep learning neural network is trained can fail to match a second spatial resolution (e.g., 128) exhibited by the medical image.

In various aspects, act 2004 can include executing, by the device (e.g., via 120), the deep learning neural network on a resampled version of the medical image (e.g., 202). In various cases, the resampled version of the medical image can exhibit the first spatial resolution (e.g., 126) on which the deep learning neural network is trained.

Although not explicitly shown in FIG. 20, the first spatial resolution (e.g., 126) can be more granular than the second spatial resolution (e.g., 128), and the computer-implemented method 2000 can further comprise: up-sampling, by the device (e.g., via 118), the medical image, thereby yielding the resampled version of the medical image, wherein the executing the deep learning neural network on the resampled version of the medical image can cause the deep learning neural network to produce a first output image (e.g., 402), and wherein the first output image can exhibit the first spatial resolution (e.g., 126). In some cases, the computer-implemented method 2000 can further comprise: down-sampling, by the device (e.g., via 122), the first output image, thereby yielding a second output image (e.g., 602) that can exhibit the second spatial resolution (e.g., 128).

Although not explicitly shown in FIG. 20, the first spatial resolution (e.g., 126) can be less granular than the second spatial resolution (e.g., 128), and the computer-implemented method 2000 can further comprise: down-sampling, by the device (e.g., via 118), the medical image, thereby yielding the resampled version of the medical image, wherein the executing the deep learning neural network on the resampled version of the medical image can cause the deep learning neural network to produce a first output image (e.g., 402), and wherein the first output image can exhibit the first spatial resolution (e.g., 126). In various instances, the computer-implemented method 2000 can further comprise: up-sampling, by the device (e.g., via 122), the first output image, thereby yielding a second output image (e.g., 602) that can exhibit the second spatial resolution (e.g., 128). In various cases, the first spatial resolution (e.g., 126) can correspond to a maximum cut-off frequency of a modulation transfer function of a medical imaging device which generated the medical image.

Although not explicitly shown in FIG. 20, the deep learning neural network can belong to a set of deep learning neural networks (e.g., 1104), the set of deep learning neural networks can be respectively trained on a set of different spatial resolutions (e.g., 1106), and the first spatial resolution (e.g., 126) can be within the set of different spatial resolutions. In various cases, the computer-implemented method 2000 can further comprise: determining, by the device (e.g., via 1002), that none of the set of different spatial resolutions is more granular than and closer to the second spatial resolution (e.g., 128) than the first spatial resolution (e.g., 126); and selecting, by the device (e.g., via 1002) and from the set of deep learning neural networks, the deep learning neural network (e.g., 104) to analyze the medical image, in response to the determining.

Various embodiments described herein can be considered as a computerized tool for facilitating deep learning robustness against DFOV variations. As described herein, such computerized tool can ameliorate/address the problem of a DFOV mismatch (spatial resolution mismatch) between a deep learning neural network and a medical image on which it is desired to execute the deep learning neural network. As described herein, such computerized tool can resample the medical image such that its DFOV (spatial resolution) matches that on which the deep learning neural network was trained, can execute the deep learning neural network on the up-sampled version of the medical image, and can resample the result produced by the deep learning neural network such that its DFOV (spatial resolution) matches that of the original or un-resampled medical image. In this way, the inferencing task facilitated by the deep learning neural network can be accurately applied to the medical image, notwithstanding the DFOV mismatch (spatial resolution mismatch) between the medical image and the deep learning neural network. Accordingly, such a computerized tool thus certainly constitutes a concrete and tangible technical improvement in the field of deep learning.

Although the herein disclosure mainly describes various embodiments as applying to deep learning neural networks, this is a mere non-limiting example. In various aspects, the herein-described teachings can be extrapolated to any suitable machine learning model regardless of architecture (e.g., to neural networks, to support vector machines, to naïve Bayes models, to decision trees, to linear regression models, or to logistic regression models).

Although the herein disclosure mainly describes various embodiments as applying to medical images, this is a mere non-limiting example. In various aspects, the herein-described teachings can be extrapolated to any suitable types of imaging data (e.g., can be not limited only to imaging data in the medical/clinical context).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 21:
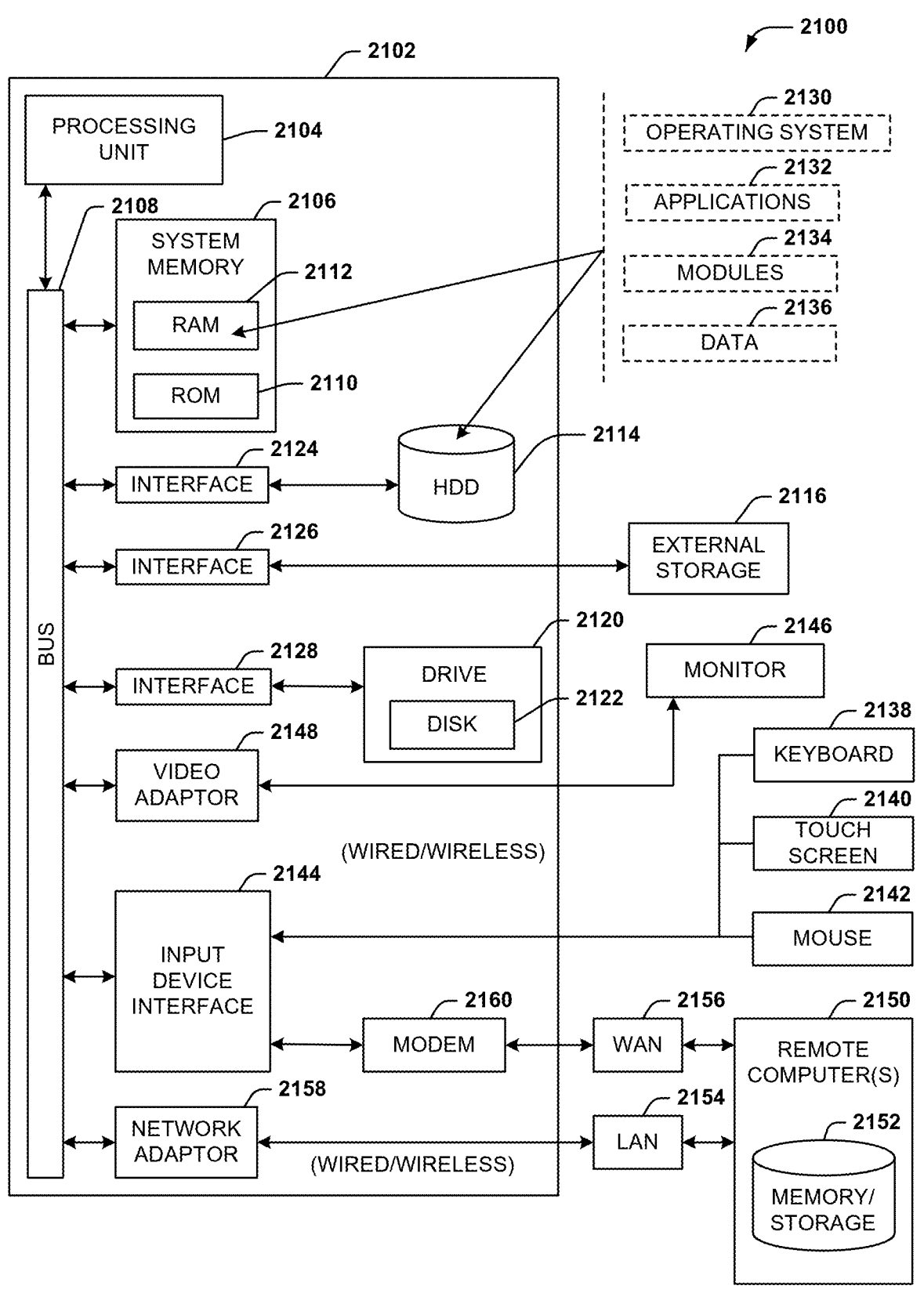
FIG. 21 illustrates a block diagram of an example, non-limiting operating environment in which one or more embodiments described herein can be facilitated.

In order to provide additional context for various embodiments described herein, FIG. 21 and the following discussion are intended to provide a brief, general description of a suitable computing environment 2100 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), one or more external storage devices 2116 (e.g., a magnetic floppy disk drive (FDD) 2116, a memory stick or flash drive reader, a memory card reader, etc.) and a drive 2120, e.g., such as a solid state drive, an optical disk drive, which can read or write from a disk 2122, such as a CD-ROM disc, a DVD, a BD, etc. Alternatively, where a solid state drive is involved, disk 2122 would not be included, unless separate. While the internal HDD 2114 is illustrated as located within the computer 2102, the internal HDD 2114 can also be configured for external use in a suitable chassis (not shown). Additionally, while not shown in environment 2100, a solid state drive (SSD) could be used in addition to, or in place of, an HDD 2114. The HDD 2114, external storage device(s) 2116 and drive 2120 can be connected to the system bus 2108 by an HDD interface 2124, an external storage interface 2126 and a drive interface 2128, respectively. The interface 2124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, or data can also be cached in the RAM 2112. The systems and methods described herein can be implemented utilizing various commercially available operating systems or combinations of operating systems.

Computer 2102 can optionally comprise emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can comprise one virtual machine (VM) of multiple VMs hosted at computer 2102. Furthermore, operating system 2130 can provide runtime environments, such as the Java runtime environment or the .NET framework, for applications 2132. Runtime environments are consistent execution environments that allow applications 2132 to run on any operating system that includes the runtime environment. Similarly, operating system 2130 can support containers, and applications 2132 can be in the form of containers, which are lightweight, standalone, executable packages of software that include, e.g., code, runtime, system tools, system libraries and settings for an application.

Further, computer 2102 can be enable with a security module, such as a trusted processing module (TPM). For instance with a TPM, boot components hash next in time boot components, and wait for a match of results to secured values, before loading a next boot component. This process can take place at any layer in the code execution stack of computer 2102, e.g., applied at the application execution level or at the operating system (OS) kernel level, thereby enabling security at any level of code execution.

A user can enter commands and information into the computer 2102 through one or more wired/wireless input devices, e.g., a keyboard 2138, a touch screen 2140, and a pointing device, such as a mouse 2142. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 1394 serial port, a game port, a USB port, an IR interface, a BLUETOOTH® interface, etc.

A monitor 2146 or other type of display device can be also connected to the system bus 2108 via an interface, such as a video adapter 2148. In addition to the monitor 2146, a computer typically includes other peripheral output devices (not shown), such as speakers, printers, etc.

The computer 2102 can operate in a networked environment using logical connections via wired or wireless communications to one or more remote computers, such as a remote computer(s) 2150. The remote computer(s) 2150 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2152 is illustrated. The logical connections depicted include wired/wireless connectivity to a local area network (LAN) 2154 or larger networks, e.g., a wide area network (WAN) 2156. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2154 through a wired or wireless communication network interface or adapter 2158. The adapter 2158 can facilitate wired or wireless communication to the LAN 2154, which can also include a wireless access point (AP) disposed thereon for communicating with the adapter 2158 in a wireless mode.

When used in a WAN networking environment, the computer 2102 can include a modem 2160 or can be connected to a communications server on the WAN 2156 via other means for establishing communications over the WAN 2156, such as by way of the Internet. The modem 2160, which can be internal or external and a wired or wireless device, can be connected to the system bus 2108 via the input device interface 2144. In a networked environment, program modules depicted relative to the computer 2102 or portions thereof, can be stored in the remote memory/ storage device 2152. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above, such as but not limited to a network virtual machine providing one or more aspects of storage or processing of information. Generally, a connection between the computer 2102 and a cloud storage system can be established over a LAN 2154 or WAN 2156 e.g., by the adapter 2158 or modem 2160, respectively. Upon connecting the computer 2102 to an associated cloud storage system, the external storage interface 2126 can, with the aid of the adapter 2158 or modem 2160, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 22 is a schematic block diagram of a sample computing environment 2200 with which the disclosed subject matter can interact. The sample computing environment 2200 includes one or more client(s) 2210. The client(s) 2210 can be hardware or software (e.g., threads, processes, computing devices). The sample computing environment 2200 also includes one or more server(s) 2230. The server(s) 2230 can also be hardware or software (e.g., threads, processes, computing devices). The servers 2230 can house threads to perform transformations by employing one or more embodiments as described herein, for example. One possible communication between a client 2210 and a server 2230 can be in the form of a data packet adapted to be transmitted between two or more computer processes. The sample computing environment 2200 includes a communication framework 2250 that can be employed to facilitate communications between the client(s) 2210 and the server(s) 2230. The client(s) 2210 are operably connected to one or more client data store(s) 2220 that can be employed to store information local to the client(s) 2210. Similarly, the server(s) 2230 are operably connected to one or more server data store(s) 2240 that can be employed to store information local to the servers 2230.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a non-transitory computer-readable memory, the computer-executable components comprising:
    an access component that accesses a deep learning neural network trained to perform an inferencing task on training medical images respectively having a first spatial resolution;
    a pre-execution resample component that receives a medical image having a second spatial resolution different from the first spatial resolution and resamples the medical image into the first spatial resolution, thereby yielding a resampled version the of the medical image having the first spatial resolution;
    an execution component that applies the resampled version of the medical image as input to the deep learning neural network to produce a first output image having the first spatial resolution; and
    a post-execution resample component that resamples the first output image into the second spatial resolution, thereby yielding a second output image having the second spatial resolution.

2. The system of claim 1, wherein the first spatial resolution is more granular than the second spatial resolution.

3. The system of claim 1, wherein the first spatial resolution is less granular than the second spatial resolution.

4. The system of claim 3, wherein the first spatial resolution corresponds to a maximum cut-off frequency in a modulation transfer function of a medical imaging device which generated the medical image.

5. The system of claim 1, wherein the deep learning neural network belongs to a set of deep learning neural networks, wherein each deep learning neural network of the set is trained to perform the inferencing task for a different spatial resolution of among a set of different spatial resolutions, the first spatial resolution being within the set of different spatial resolutions, and wherein the computer-executable components further comprise:
a selection component that selects, from the set of deep learning neural networks, the deep learning neural network to analyze the medical image, based on a first determination that none of the different spatial resolutions of the set corresponds to the second spatial resolution and a second determination that the first spatial resolution is more granular than and closer to the second spatial resolution than other spatial resolutions of the set of different spatial resolutions.

6. The system of claim 1, wherein the inferencing task comprises image quality enhancement, image denoising, image kernel transformation, or image segmentation.

7. A computer-implemented method, comprising:
accessing, by a computing device operatively coupled to a processor, a deep learning neural network trained to perform an inferencing task on training medical images respectively having a first spatial resolution;
receiving, by the system, a medical image having a second spatial resolution different from the first spatial resolution;
re-sampling, by the system, the medical image into the first spatial resolution, thereby yielding a resampled version the of the medical image having the first spatial resolution;

executing, by the computing device, the deep learning neural network on the resampled version of the medical image, wherein the executing causes the deep learning neural network to produce a first output image having the first spatial resolution; and re-sampling, by the system, the first output image into the second spatial resolution, thereby yielding a second output image having the second spatial resolution.

8. The computer-implemented method of claim 7, wherein the first spatial resolution is more granular than the second spatial resolution.

9. The computer-implemented method of claim 7, wherein the first spatial resolution is less granular than the second spatial resolution.

10. The computer-implemented method of claim 9, wherein the first spatial resolution corresponds to a maximum cut-off frequency in a modulation transfer function of a medical imaging device which generated the medical image.

11. The computer-implemented method of claim 7, wherein the deep learning neural network belongs to a set of deep learning neural networks, wherein the set of each deep learning neural network of the set is trained to perform the inferencing task for a different spatial resolution of among a set of different spatial resolutions, the first spatial resolution being within the set of different spatial resolutions, and further comprising:

determining, by the computing device, that none of the different spatial resolutions of the set corresponds to the second spatial resolution and that the first spatial resolution is more granular than and closer to the second spatial resolution that other spatial resolutions of the set of different spatial resolutions; and selecting, by the computing device and from the set of deep learning neural networks, the deep learning neural network to analyze the medical image, in response to the determining.

12. The computer-implemented method of claim 7, wherein the inferencing task comprises image quality enhancement, image denoising, image kernel transformation, or image segmentation.

13. A computer program product comprising a computer-readable memory having program instructions embodied therewith, the program instructions executable by a processor to cause the processor to:

access a deep learning neural network trained to perform an inferencing task on training medical images respectively having a first spatial resolution;

receive a medical image having a second spatial resolution different from the first spatial resolution;

re-sample the medical image into the first spatial resolution, thereby yielding a resampled version the of the medical image having the first spatial resolution;

apply the resampled version of the medical image as input to the deep learning neural network to produce a first output image having the first spatial resolution; and re-sample the first output image into the second spatial resolution, thereby yielding a second output image having the second spatial resolution.

14. The computer program product of claim 13, wherein the first spatial resolution is more granular than the second spatial resolution.

15. The computer program product of claim 13, wherein the first spatial resolution is less granular than the second spatial resolution.

16. The computer program product of claim 13, wherein the inferencing task comprises image quality enhancement, image denoising, image kernel transformation, or image segmentation.

17. The computer program product of claim 13, wherein the deep learning neural network belongs to a set of deep learning neural networks, wherein each deep learning neural network of the set is trained to perform the inferencing task for a different spatial resolution of among a set of different spatial resolutions, the first spatial resolution being within the set of different spatial resolutions, and wherein the program instructions are executable by the processor to further cause the processor to:

select, from the set of deep learning neural networks, the deep learning neural network to analyze the medical image, based on a determination that none of the different spatial resolutions of the set corresponds to the second spatial resolution.

18. The computer program product of claim 13, wherein the deep learning neural network belongs to a set of deep learning neural networks, wherein each deep learning neural network of the set is trained to perform the inferencing task for a different spatial resolution of among a set of different spatial resolutions, the first spatial resolution being within the set of different spatial resolutions, and wherein the program instructions are executable by the processor to further cause the processor to:

select, from the set of deep learning neural networks, the deep learning neural network to analyze the medical image, based on a first determination that none of the different spatial resolutions of the set corresponds to the second spatial resolution and a second determination that the first spatial resolution is more granular than and closer to the second spatial resolution than other spatial resolutions of the set of different spatial resolutions.

19. The system of claim 1, wherein the deep learning neural network belongs to a set of deep learning neural networks, wherein each deep learning neural network of the set is trained to perform the inferencing task for a different spatial resolution of among a set of different spatial resolutions, the first spatial resolution being within the set of different spatial resolutions, and wherein the computer-executable components further comprise:

a selection component that selects, from the set of deep learning neural networks, the deep learning neural network to analyze the medical image, based on a determination that none of the different spatial resolutions of the set corresponds to the second spatial resolution and a second determination that the first spatial resolution.

20. The computer-implemented method of claim 7, wherein the deep learning neural network belongs to a set of deep learning neural networks, wherein each deep learning neural network of the set is trained to perform the inferencing task for a different spatial resolution of among a set of different spatial resolutions, the first spatial resolution being within the set of different spatial resolutions, and further comprising:

determining, by the computing device, that none of the different spatial resolutions of the set corresponds to the second spatial resolution and that the first spatial resolution; and selecting, by the computing device and from the set of deep learning neural networks, the deep learning neural network to analyze the medical image, in response to the determining.

* * * * *